(12) United States Patent
Hannebauer

(10) Patent No.: US 11,997,415 B2
(45) Date of Patent: May 28, 2024

(54) SAMPLED ANALOG STORAGE SYSTEM

(71) Applicant: HYPHY USA Inc., San Jose, CA (US)

(72) Inventor: Robert Steven Hannebauer, Vancouver (CA)

(73) Assignee: HYPHY USA INC., San Jose, CA (US)

( * ) Notice: Subject to any disclaimer, the term of this patent is extended or adjusted under 35 U.S.C. 154(b) by 53 days.

(21) Appl. No.: 17/887,849

(22) Filed: Aug. 15, 2022

(65) Prior Publication Data

US 2023/0059143 A1 Feb. 23, 2023

Related U.S. Application Data

(60) Provisional application No. 63/322,811, filed on Mar. 23, 2022, provisional application No. 63/234,157, filed on Aug. 17, 2021.

(51) Int. Cl.
*H04N 19/00* (2014.01)
*H04B 1/707* (2011.01)
(Continued)

(52) U.S. Cl.
CPC ............... *H04N 5/92* (2013.01); *H04B 1/707* (2013.01); *H04N 7/10* (2013.01); *H04N 19/00* (2013.01)

(58) Field of Classification Search
CPC . H04B 1/707; H04B 1/06; H04B 1/04; H04B 1/69; H04L 27/36; H04L 27/38;
(Continued)

(56) References Cited

U.S. PATENT DOCUMENTS 3,204,035 A 8/1965 Ballard et al.
3,795,765 A 3/1974 DeGroat et al.
(Continued)

FOREIGN PATENT DOCUMENTS

CN 101933277 12/2010
CN 101969319 2/2011
(Continued)

OTHER PUBLICATIONS

Eltokhy et al., "A Low Power Analog Matched-Filter with Smart Sliding Correlation", IEEJ Trans., EIS, vol. 123, No. 11, 2003, pp. 1970-1976.
(Continued)

*Primary Examiner* — David S Huang
(74) *Attorney, Agent, or Firm* — Beyer Law Group LLP

(57) ABSTRACT

Digital or analog samples are sent from a video source to a video storage subsystem that encodes the samples into analog levels, stores the analog levels for a period of time, decodes the analog levels back into digital samples and then sends the digital samples to a video sink for display, N samples are encoded into L analog levels for storage. The storage subsystem may be located at the video source, at the video sink, or anywhere in between the two. The storage subsystem may be located on an electromagnetic pathway over which the L encoded analog levels are transmitted from a video source as an analog signal. The L encoded analog levels are written to storage and then later read from storage and retransmitted over the electromagnetic pathway toward a video sink. The storage subsystem may also be integrated with a transmitter that encodes the samples into analog levels for storage or may be integrated with a receiver that stores the analog levels and then decodes the analog levels back into samples. A sentinel track in the storage array detects attenuation or offset which is then compensated for.

43 Claims, 17 Drawing Sheets

(51) Int. Cl.
*H04N 5/92* (2006.01)
*H04N 7/10* (2006.01)

(58) Field of Classification Search
CPC .......... H04N 7/106; H04N 7/108; H04N 7/10; H04N 7/102; H04N 5/92
USPC .......... 375/140, 146; 345/204, 520; 386/230
See application file for complete search history.

(56) References Cited

U.S. PATENT DOCUMENTS

| | | |
|---|---|---|
| 5,793,759 A | 8/1998 | Rakib et al. |
| 5,796,774 A | 8/1998 | Kato |
| 5,870,414 A | 2/1999 | Chaib et al. |
| 5,936,997 A | 8/1999 | Kanda |
| 5,938,787 A | 8/1999 | Stark et al. |
| 5,956,333 A | 9/1999 | Zhou et al. |
| 5,966,376 A | 10/1999 | Rakib et al. |
| 6,018,547 A | 1/2000 | Arkhipkin |
| 6,128,309 A | 10/2000 | Tariki et al. |
| 6,154,456 A | 11/2000 | Rakib et al. |
| 6,289,039 B1 | 9/2001 | Garodnick |
| 6,310,923 B1 | 10/2001 | Lee et al. |
| 6,456,607 B2 | 9/2002 | Arai et al. |
| 6,480,559 B1 | 11/2002 | Dabak et al. |
| 6,751,247 B1 | 6/2004 | Zhengdi |
| 6,763,009 B1 | 7/2004 | Bedekar et al. |
| 6,956,891 B2 | 10/2005 | Tan et al. |
| 7,710,910 B2 | 5/2010 | Ode et al. |
| 7,793,022 B2 | 9/2010 | Travers et al. |
| 7,796,575 B2 | 9/2010 | Lim et al. |
| 7,873,097 B1 | 1/2011 | Luecke et al. |
| 7,873,980 B2 | 1/2011 | Horan et al. |
| 7,908,634 B2 | 3/2011 | Keady et al. |
| 7,937,605 B2 | 5/2011 | Rea et al. |
| 7,996,584 B2 | 8/2011 | Keady et al. |
| 8,073,647 B2 | 12/2011 | Horan et al. |
| 8,094,700 B2 | 1/2012 | Okazaki |
| 8,272,023 B2 | 9/2012 | Horan et al. |
| 8,280,668 B2 | 10/2012 | Horan et al. |
| 8,295,296 B2 | 10/2012 | Keady et al. |
| 8,369,794 B1 | 2/2013 | Bharghavan et al. |
| RE44,199 E | 5/2013 | Garodnick |
| 8,520,776 B2 | 8/2013 | Rea et al. |
| 8,546,688 B2 | 10/2013 | Horan et al. |
| 8,674,223 B2 | 3/2014 | Horan et al. |
| 8,674,224 B2 | 3/2014 | Horan et al. |
| 8,674,225 B2 | 3/2014 | Horan et al. |
| 8,674,226 B2 | 3/2014 | Horan et al. |
| 8,680,395 B2 | 3/2014 | Horan et al. |
| 8,705,588 B2 | 4/2014 | Odenwalder |
| 9,324,478 B2 | 4/2016 | Horan et al. |
| 9,970,768 B2 | 5/2018 | Monroe et al. |
| 10,158,396 B2 | 12/2018 | Hannebauer et al. |
| 10,763,914 B2 | 9/2020 | Hannebauer et al. |
| 11,025,292 B2 | 6/2021 | Hannebauer et al. |
| 11,394,422 B2 | 7/2022 | Hannebauer et al. |
| 11,463,125 B2 | 10/2022 | Hannebauer et al. |
| 11,716,114 B2 | 8/2023 | Hannebauer |
| 2002/0013926 A1 | 1/2002 | Kim et al. |
| 2002/0097779 A1 | 7/2002 | Bang et al. |
| 2002/0154620 A1 | 10/2002 | Azenkot et al. |
| 2003/0139178 A1 | 7/2003 | Uesugi et al. |
| 2004/0120415 A1 | 6/2004 | Song et al. |
| 2005/0069020 A1 | 3/2005 | Lakkis |
| 2008/0084920 A1 | 4/2008 | Okazaki |
| 2008/0106306 A1 | 5/2008 | Keady et al. |
| 2010/0013579 A1 | 1/2010 | Horan et al. |
| 2010/0091990 A1 | 4/2010 | Etemad et al. |
| 2010/0142723 A1 | 6/2010 | Bucklen |
| 2010/0321591 A1 | 12/2010 | Onomatsu |
| 2011/0044409 A1 | 2/2011 | Yoshimoto et al. |
| 2012/0014464 A1 | 1/2012 | Eiger et al. |
| 2014/0218616 A1 | 8/2014 | Toba et al. |
| 2016/0127087 A1 | 5/2016 | Feher |
| 2019/0174027 A1 | 6/2019 | Lv et al. |
| 2019/0260629 A1 | 8/2019 | Nikopour et al. |
| 2020/0014419 A1* | 1/2020 | Hannebauer ............ H04B 1/06 |
| 2022/0302953 A1 | 9/2022 | Hannebauer et al. |
| 2023/0223981 A1 | 7/2023 | Hannebauer |
| 2023/0230559 A1 | 7/2023 | Friedman |

FOREIGN PATENT DOCUMENTS

| | | |
|---|---|---|
| CN | 101917209 | 7/2015 |
| EP | 0 727 881 | 8/1996 |
| EP | 1 079 536 | 2/2001 |
| EP | 1 968 324 | 9/2008 |
| JP | 08293818 | 11/1996 |
| JP | H09312590 | 12/1997 |
| JP | 2001-144653 | 5/2001 |
| JP | 2001510658 | 7/2001 |
| JP | 2007-150971 | 6/2007 |
| WO | WO 97/02663 | 1/1997 |
| WO | WO 98/52365 | 11/1998 |
| WO | 2010/106330 | 9/2010 |
| WO | 2018-170546 | 9/2010 |
| WO | WO 2012/007785 | 1/2012 |
| WO | WO 2017/049347 | 3/2017 |

OTHER PUBLICATIONS

Van der Heij den, "An Analog Correlator for a High Speed DS-CDMA Modem", Eindhoven University of Technology, Department of Electrical Engineering Telecommunication Technology and Electromagnetics, 1998, 65 pages.

Shanmugam et al., "An Analog Spread-Spectrum Interface for Power-Line Data Communication in Home Networking", IEEE transactions on Power Delivery, vol. 20, No. 1, Jan. 2005.

Immink, "Construction of DC-free Codes Using the fast Hadamard Transform", Nov. 7, 2001, 6 pages.

* cited by examiner

Attenuation and Offset Example

SAMPLED ANALOG STORAGE SYSTEM

CROSS-REFERENCE TO RELATED APPLICATIONS

This application claims priority of U.S. provisional patent application No. 63/234,157, filed Aug. 17, 2021, entitled "Method and Apparatus for Pulsital Data Storage Systems," and of U.S. provisional patent application No. 63/322,811, filed Mar. 23, 2022, entitled "Encoder Circuit with Memory Array for Spread Spectrum Video Transport," both of which are hereby incorporated by reference.

This application incorporates by reference U.S. application Ser. No. 15/925,123 (HYFYP001), filed on Mar. 19, 2018, now U.S. Pat. No. 10,158,396, U.S. application Ser. No. 16/494,901 (HYFYP002) filed on Sep. 17, 2019, U.S. application No. 63/232,486 (HYFYP003P) filed on Aug. 12, 2021, U.S. application Ser. No. 17/879,499 (HYFYP003) filed on Aug. 2, 2022, U.S. application Ser. No. 17/686,790 (HYFYP04AX1), filed on Mar. 4, 2022, U.S. application Ser. No. 17/851,821 (HYFYP007), filed on Jun. 28, 2022, U.S. application No. 63/280,017 (HYFYP009P2), filed on Nov. 16, 2021, and U.S. application No. 63/317,746 (HYFYP013P2), filed on Mar. 8, 2022.

FIELD OF THE INVENTION

The present invention relates generally to video transport. More specifically, the present invention relates to storing video samples that have been encoded.

BACKGROUND OF THE INVENTION

An electromagnetic propagation pathway (EM path) enables energy propagation as a signal from a transmitting terminal to a receiving terminal across a physical space or medium. EM paths for media signal communication are generally available in one of three types: wire pair (cable), free space (wireless), and optical waveguide (optical fiber).

Various types of EM paths cover disparate spatial extents. Such arrangements include, by way of example, the space within an integrated circuit package, within the chassis of a camera, within a smartphone, tablet or computer, within or around an equipment wearer's body, within a display unit, within the constructed environments that surround people (such as within a room or a vehicle), within or throughout a building or across a campus, and between any of these extents. Some EM paths propagate media signals over distances exceeding tens of kilometers, thus enabling telecommunications.

An electromagnetic signal (EM signal) is a variable represented by electromagnetic energy whose amplitude changes over time. An EM signal may be characterized as continuous or discrete variables independent in the two dimensions of time and amplitude. The temporal dimension may be considered by the system designer to be a continuous or a discrete variable. In continuous time, the interval between successive values being assigned to the variable is limited by the resolution at which it is possible to measure time. In discrete (or sampled) time, the time between successive values being assigned to the variable is predetermined (for example, by the measurer's ability to discriminate different measurements), and the average sampling interval's inverse is the EM signal's "sampling rate."

Amplitude may also be considered by the system designer as continuous or discrete. In continuous amplitude, the number of possible amplitudes of the EM signal value is limited by the resolution at which it is possible to measure the received energy. That is, the amplitude may vary between upper and lower magnitude limits. In discrete or quantized amplitude, the number of possible amplitudes of the EM signal value between minimum and maximum is predetermined. The logarithm base 2 of the number of different possible amplitudes is a quantized EM signal's "number of bits" of dynamic range.

There are four taxonomic combinations of these two attributes, and thus four distinct types of EM signal: "Analog" signals are continuous-time, continuous-amplitude EM signals; "Digital" signals are discrete-time, discrete-amplitude EM signals; "sampled analog" signals are discrete-time, continuous-amplitude EM signals; "Neuronal" (or "neurolog") signals are continuous-time, discrete-amplitude EM signals.

During an interval, some portion of an EM signal is in transit between the transmitter and receiver while propagating through the EM path; that is, the rate of energy propagation may be finite through any EM pathway.

Due to such phenomena as attenuation, reflections due to impedance mismatches, and interference from other signals, every EM path degrades EM signals that propagate through it, in the sense that measurements of an EM signal taken at a receiving terminal are certain to differ from the levels made available at the corresponding transmitting terminal. Thus, every physical EM path is an imperfect electromagnetic propagation pathway. Measurements taken at a receiving terminal are always subject to error with respect to corresponding levels made available to the transmitting terminal paired to the receiving terminal through the EM path. The quality of any given EM path is characterized by the comparison of the levels measured at the receiving terminal after propagation through the EM path to the levels made available at the transmitter.

Focal plane brightness changes with location may be measured as voltages in image sensors. Each measured brightness is subject to stochastic noise from diverse sources. A plurality of locations of display plane brightness may be generated from voltages in display panels. Each generated brightness is also subject to stochastic noise from other diverse sources.

Conventional video storage subsystems truncate each voltage to a symbol with a predetermined bit depth. Each bit of this crude approximation is preserved over time and reproduced correctly at the storage subsystem output when accessed. The requirement for each symbol (and each bit) to be preserved precisely arises because conventional video storage solutions leverage mechanisms that were created to store documents, wherein integrity demands that each character of a document be reproduced precisely. In addition, storage cells in a conventional storage subsystem will age and data may be lost.

Further, given the huge amount of bandwidth needed for the transmission of video, various types of digital video compression are typically used, such as MPEG, AVC, and HEVC. The problems with video compression include limited interoperability, increased implementation cost, added latency, and reduced image fidelity. As a result, some degree of picture quality is degraded when displaying compressed video versus uncompressed or visually lossless video.

Thus, conventional video storage subsystems require storage of video data in digital form (i.e., in binary digits) leading to disadvantages such as increased energy and storage required, use of compression, degradation of storage cells, etc., all of which increase cost, size, and energy use of the video storage subsystem, and increase complexity of the video transport used.

A video storage subsystem capable of storing high-quality, high-definition video that is more resilient, uses less energy, and less space is therefore needed.

SUMMARY OF THE INVENTION

To achieve the foregoing, and in accordance with the purpose of the present invention, a video storage subsystem is disclosed that is more resilient than conventional storage subsystems, uses less energy and requires less space for storage of samples of information, and does not require compression.

One advantage of using the techniques of spread spectrum video transport (SSVT) in the context of image storage is that images themselves are inherently noisy and are captured on intrinsically error-prone sensors and displayed on intrinsically noisy displays, and then viewed by extremely complex and robust human vision systems. As a result, the communication requirements for video are very different from the communication requirements for conventional digital content (such as spreadsheets, software, documents, electronic mail, etc.) wherein bit-perfect and error free transmission is required. In the prior art, conventional video transmission and storage treats a video signal just like any other kind of digital document, along with the strict requirements associated with that digital representation. With SSVT, however, video signals are transmitted and stored in an electrically robust and efficient manner Among the advantages of SSVT is that any uncompensated errors occurring in the EM signal at the receiver manifest in the reconstructed images as broad-spectrum temporal and spatial noise. Such white noise is more palatable to human cognition than are the blank screens, repeated images, and blocky compression artifacts that arise from errors in the conventional bit-serial transmission.

In addition, using the SSVT encoding provided herein in order to store analog samples in a storage array provides greater resiliency for the stored samples long term, making them more resistant to signal droop due to leakage.

Another advantage is an increase in the information density of the storage. By way of example, consider the storage of prior art digital samples that are ten-bit values; this means that each sample requires ten storage cells, whereas, with the present invention, each analog level to be stored in the array only requires the equivalent of a single storage cell.

In an SSVT system, groups of sampled analog values, henceforth called samples, are encoded together and stored together. Here the value of N represents the number of samples stored together, L is the length of the coding vector and also corresponds to the number of storage locations used to store the N samples. Each of the N samples is in turn encoded or spread across the L storage locations, reducing the energy density of the information stored as that analog value across many "L" locations. These spread-out N samples are added together and stored in the L locations. Each of the L locations contains the 1/L of the analog value of each of the N samples. While the spreading reduces the energy or information density of a given signal, the spreading also increases its resiliency. It reduces the effect of any given error in any given cell among the L number of storage cells. This loss of information density is recouped by the fact that the spreading encoding is different for each of the N sample values and is crafted to ensure orthogonality from each of its neighboring encoded samples that it shares a location.

Even though N digital or analog samples will be represented by L analog samples stored within an array, and L>=N>=2, L will be close in value to N, and typically not more than two or three times the value of N; it is unlikely that L will be ten times the value of N. At higher values of L versus the number of samples N the resiliency is increased.

Since the storage is an analog value and not discreet binary values, for a 10-bit system there would be needed 10 storage cells, whereas an SSVT system requires only one of the storage locations. This means that for a value of L that is close to the value of N, there is at least a factor of ten in power savings used during the act of storing the value when using the present invention for storing analog samples in a storage array, not to mention the decrease in storage area required. The energy savings per storage cell is even greater because while a digital representation of the binary digit may need to swing between 0 V and 1.8 V as the contents of the storage cell change, it will be uncommon for an analog value in a storage cell of the present invention to swing between the extremes of 0 V and 1 V repeatedly. And, every time a storage cell needs to be driven to a particular value that takes a certain amount of power, a certain amount of current needs to flow to charge that storage cell; the storage of analog levels in the storage array thus further reduces energy usage of the storage array because it will consistently use less current and fewer storage cells (and consuming less power) in order to store the same amount of prior art information.

Further, storage of video samples into the novel storage subsystem allows storage of complete videos (events, documentaries, movies, etc.), which may then be streamed, played back, or transmitted directly from that storage subsystem for display upon a display unit such as a mobile telephone, tablet computer, computer, television, billboard, scoreboard, etc. The invention is also applicable to samples other than video samples.

In a first embodiment digital samples are sent from a video source to a video storage subsystem that encodes the samples into analog levels, stores the analog levels for a period of time, decodes the analog levels back into digital samples and then sends the digital samples to a video sink for display.

In a second embodiment samples are sent from a video source to a video storage subsystem that encodes the samples into analog levels, stores the analog levels for a period of time, decodes the analog levels back into samples and returns the samples to the video source for later transmission to a video sink for display.

In a third embodiment samples are sent from a video sink device to a video storage subsystem that encodes the samples into analog levels, stores the analog levels for a period of time, decodes the analog levels back into samples and returns the samples to the video sink for display. This embodiment is useful for when samples arrive at a video sink device and are stored for a period of time before being retrieved from storage and then displayed at the video sink.

In a fourth embodiment samples are sent from a video source to transmitter integrated with a video storage subsystem that encodes the samples into analog levels, stores the analog levels for a period of time, and then sends the encoded analog levels serially over a transmission medium toward a video sink for eventual decoding and display.

In a fifth embodiment a video storage subsystem receives analog levels over a transmission medium that have been encoded by a transmitter and at least one encoder, stores the analog levels for a period of time, and then transmits the analog levels serially over the transmission medium toward a video sink for eventual decoding and display.

In a sixth embodiment a video storage subsystem receives analog levels over a transmission medium that have been encoded by a transmitter and at least one encoder, stores the analog levels for a period of time, decodes the analog levels using at least one decoder and a receiver into video samples, and sends the samples to a video sink for display.

In a seventh embodiment a video storage subsystem receives analog voltages directly from a sensor of a video source (e.g., a still camera, video camera, etc.) without the need for any ADCs, stores the analog levels for a period of time, decodes the analog levels into the original samples, and then displays the samples (e.g., as an image, photograph or video) on a display of the camera, etc.

In an eighth embodiment, analog voltage samples are sent directly from a sensor of a video source (e.g., a still camera, video camera, etc.) to an SSVT transmitter without the need for any ADCs at the source or transmitter; the SSVT signal is then sent to a receiver that then decodes the SSVT signal into a standard binary representation (using one or more ADCs) thereby effectively moving the ADCs to a remote location. FIG. 1 shows this embodiment 99 in which the series of analog voltages are presented directly to one more encoders of the transmitter 28 as successive groups of N analog samples. The encoding is then analog encoding. The analog samples may originate at sensor 16 or at storage 98 (path from storage 98 to transmitter 28 not explicitly shown). In this embodiment, there is no need for ISP 20, streamer 21 or retimer 26. The SSVT signal on medium 34 (or its decoded form) may then be stored at storage 100b, 100c, 100d, or at embodiment 96 as is herein described.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
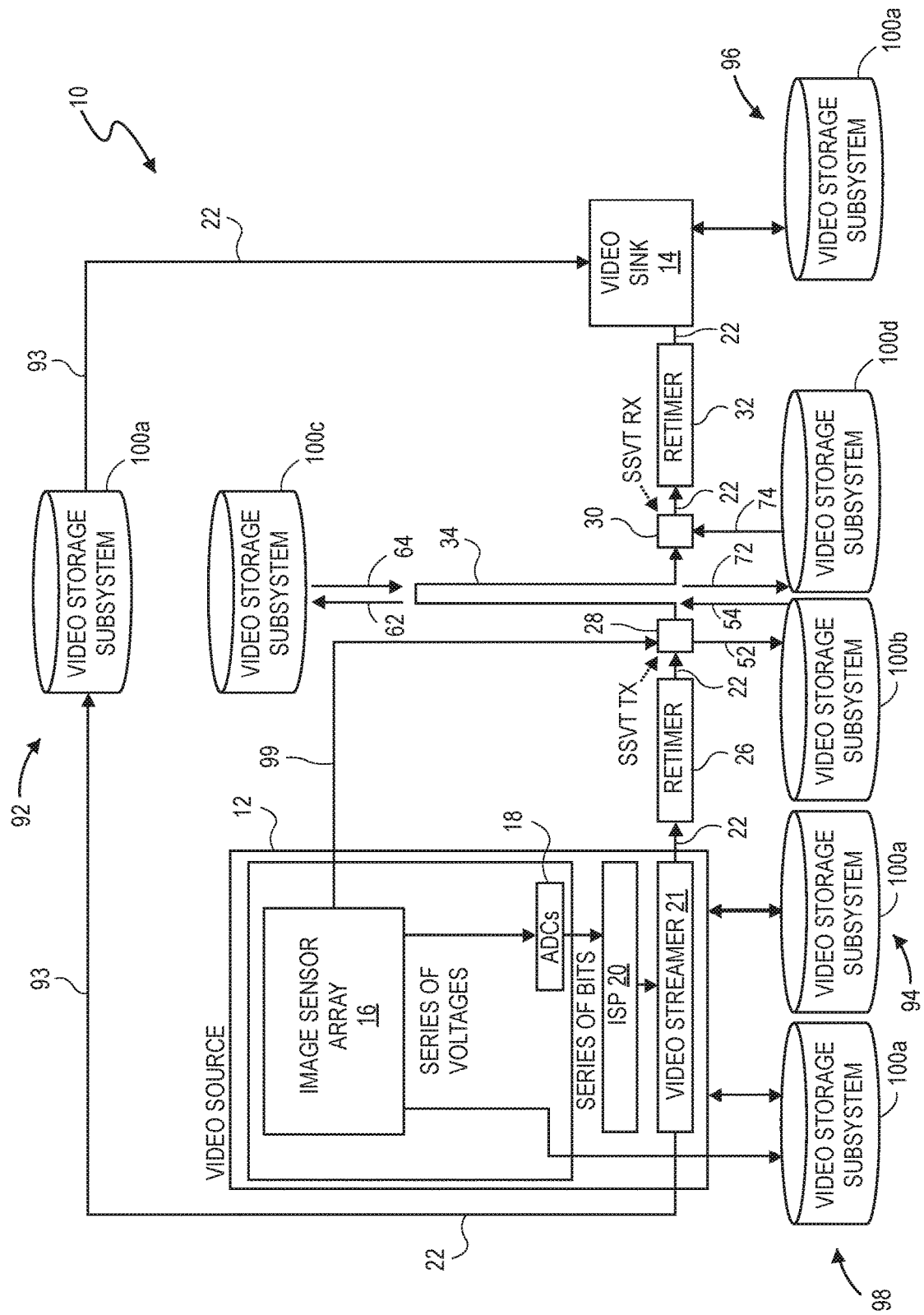
FIG. 1 is a system diagram illustrating transmission of electromagnetic (EM) video signals from a digital video source to a digital video sink using Spread-Spectrum Video Transport (SSVT).

We recognize that the stochastic nature of video I/O equipment and the intrinsic resilience against white noise exhibited by human visual cognition conspire to create requirements for video storage that need not be the same as the strict requirements for character storage, document storage, data storage, etc., all of which require storage of binary digits.

A video storage subsystem needs only store values (including video samples and electrical levels) subject to the requirement that each output value is a fit-for-purpose approximation of the input value that may be achieved within the storage subsystem's energy/volume budget because of the tolerance of AI/ML systems and human visual cognition.

We further recognize that real-valued approximation in a storage subsystem increases density while process gain increases resilience. Approximating video samples and electrical levels as stored voltages, charges, currents etc., instead of the conventional storage requirement of precisely maintaining a k-bit decimation, increases energy density by at least a factor of ten. For example, rather than expend considerable resources preserving individual bits precisely as in the prior art, our approximate video storage subsystem stores far more information per sample with far less energy/density (area) as a voltage/charge on a simple capacitor.

Further, representing groups of values to be stored in memory as orthogonally-encoded vectors with process gain increases resilience by at least a factor of the square root of the vector length.

Media Signals

Media signals are a special type of EM signals. A media signal is an ordered series of samples. A media signal may be produced by a physical measuring device, for example a microphone, an image sensor, or a video engine, for example a graphics processor. The input to an image or video display matrix is also a media signal.

Video signals are an important class of media signals. As an embodiment, media signals are considered video signals where appropriate. There are many alternative electronic formats for video signals. A video consists of an ordered sequence of images, each of which in turn describes a two-dimensional array of color values. Color values may be represented in diverse color spaces, and the resolution of each frame, and the frame rate, all vary. Most video signals may be represented as a one-dimensional list of color values, i.e., an ordered series of samples. In certain disclosed embodiments, these samples are quantized values in digital video systems and continuous values in sampled-analog video systems.

A media signal snippet is a finite contiguous sub-series from the ordered series of samples of a media signal. Examples of media snippets include still images (e.g., .JPG, .BMP) and movies (e.g., .MP4, .AVI). A media signal source, such as a video camera, produces an arbitrarily long but finite sequence of media signal snippets. It should be noted that snippets are intrinsically final while media signals are not. Video signals originate in image sensors as sequences of frames of light intensity measurements. Each row of sample measurement is a snippet (line), and each frame is a snippet.

Physical Basis of Media Signal Snippets

Common examples of physical embodiments of media snippets include voltages across an array of capacitors, as in image sensors and liquid crystal displays, and as in the contents of dynamic computer memories; ink on paper; or currents through an array of diodes, as in a direct LED display. A media signal snippet may also be embodied as a waveform traveling through free space or as a signal in a cable or optical fiber. Most familiar physical embodiments of media signal snippets are spatially compact. Examples of familiar embodiments for images, an image being an especially important kind of media signal snippet, include the set of voltages held in the capacitors in the image sensor of a camera, the set of emitter drive currents provided to the LED array of a direct LED display and the set of bits representing an image in a frame buffer memory of an electronics apparatus.

Media Signal Communication

Media signal communication is a physical process that repeatedly transforms sets of samples from one or more input media signals between physical embodiments, from one place to another, through electromagnetic propagation. A media signal communication system consists of a media-signal-producing device (a "source") and a media-signal-consuming device (a "sink") that exchanges energy through electromagnetic propagation across one or more EM paths. Most of the energy is allocated to conveying EM signals representing the input media signals from the source to the sink. A relatively modest further amount of energy is allocated to conveying control and status information between source and sink. For clarity regarding the direction in which video moves through the system, the source is considered to be "upstream" or "uphill" of the sink with respect to the direction of media signal communication.

The source transforms one or more input media signals by repeatedly transforming one or more input media signal snippets into intervals of one or more EM signals made available to associated EM paths. The sink reconstructs one or more output media signals by repeatedly reconstructing one or more output media signal snippets from intervals of one or more EM signals propagating across associated EM paths. While the disclosure refers to cables as an exemplary embodiment of an EM path, it is understood that the disclosed principles apply equally to all other EM paths such as wireless, optical fiber, etc.

SSVT System with Storage Subsystem

The present invention is directed to storage of analog samples in a storage array. The below description uses the example of video samples being transmitted and stored between a video source and a video sink using spread-spectrum video transport techniques. Although pixel voltages are used in this description as one type of sample, this storage technique may be used with voltages representing any of a variety of other samples such as signals from a sensor such as LIDAR values, sound values, haptic values, aerosol values, etc., and the samples may represent values other than voltages such as current, etc., before being converted into voltages for storage.

FIG. 1 is a block diagram of a system 10 showing transmission and storage of electromagnetic (EM) signals from a video source to a video sink. Once captured, video data is typically transmitted to a video display for near real-time consumption. Using an embodiment of the invention, the captured video data is stored for later transmission and consumption in a time-shifted mode. SSVT-based modulation is used to store the video data from the video source, which may be stored at the source, at the video sink, or anywhere between the two.

In one embodiment, transmission over a medium 34 is used. A stream of time-ordered video samples containing color values and pixel-related information is received from the video source, stored, transmitted, and later reconstructed for the video sink. As described in more detail below, the number and content of input video samples received from the video source depend on the color space in operation at the source, the frame format and frame rate of the device. Regardless of which color space is used, each video sample represents a measured amount of light in the designated color space at a given pixel location. As the stream of input video samples is received, the input video samples are repeatedly: "distributed" by assigning the input video samples into encoder input vectors according to a predetermined permutation, encoded by applying an SSVT-based modulation to each of the multiple encoder input vectors, applying orthogonal codes, and to generate multiple composite EM signals as analog output levels with noise-like properties that can be stored in a storage array. The EM signals are then transmitted over a transmission medium, such as an HDMI cable. On the receive side, the incoming EM signals are decoded by applying SSVT-based demodulation, applying the same orthogonal codes to reconstruct the analog output levels into output vectors. Then the output vectors are "collected" by assigning the reconstructed video samples from the output vectors to an output stream using the inverse of the predetermined permutation. As a result, the original stream of time-ordered video samples containing color and pixel-related information is conveyed from video source to video sink with storage in between. In another embodiment, transmission over conventional digital transport 93 is used.

The video source 12 includes an image sensor array 16, possibly one or more analog-to-digital converters 18, an Image Signal Processor (ISP 20), and a video streamer 21 responsible for generating a stream of video samples 22. Video source 12 is any device capable of capturing imaging information, such as but not limited to a video camera, an Infrared imaging device, an ultrasound imaging device, a magnetic resonance imaging (MRI) device, computed tomography, or just about any other type of imaging device capable of generating video information.

Image sensor 16 is any device capable of generating an electronic signal that is proportional to an amount of incident light, such as a planar array of photodiodes. Each photodiode represents a pixel location in the planar array. The number of photodiodes in the planar array may widely vary and is dependent on the size of the image sensor 16. Image sensor 16 may be any size. As a result, the array of photodiodes generates a set of voltages that collectively represent a frame. As the image sensor is continually refreshing at a given frame rate, multiple sets of voltages, each representing a frame, are continuously generated one after another.

With many digital image sensor arrays 16, there is typically a row of analog-to-digital converters ("ADCs") 18, with one ADC per column During a given frame interval, all the rows of the array 16 are sampled, typically one after the other from top to bottom, sometimes referred to herein as "row-major" order. With each sample, the ADCs 18 convert the sensed voltage into a digital value for the pixel position for each column in the array. A frame is complete when all the rows of the array 16 have been sampled. The above process is repeated, in row-major order, on a frame-by-frame basis. The net result is a string of digital values, with each digital value representative of a pixel position in a frame. The number of bits used to represent each sample may widely vary. For instance, each voltage may be converted by the analog-to-digital converters 18 into an 8- or 10-bit value.

The image sensor array 16 can be either monochromatic or color. In the case of the former, the digital values generated by the ADCs 18 are representative of only one color. With the latter, well-known color techniques such as Bayer filtering are typically applied. With Bayer filtering, the individual photodiodes 16 are selectively covered with filters of a predetermined color (e.g., either Red (R) or Blue (B) or Green (G)). In alternative embodiments, CYGM (Cyan, Yellow, Green and Magenta) or CMY (Cyan, Magenta and Yellow) filtering may be used. Regardless of the type of filter used, the magnitude of the filtered light is measured at each sample position.

The ISP 20 is arranged to interpolate the string of digital values received from the ADC 18. By interpolation, the ISP 20 takes the information contained in the digital values for each pixel measurement and its geometric neighborhood and defines an estimate of the color of the corresponding pixel. To output full-color images in a specific color space (there are many), the ISP 20 interpolates the "missing" color values at each location. That is, given only a single-color measurement per pixel, the ISP algorithmically estimates the "missing" color values to create, for example, an RGB or YCbCr representation for the pixel. The ISP 20 thus generates a set of samples 22 for a given pixel of a given frame, each set of samples 22 representative of the color values (either as measured and/or interpolated) for a given pixel position within the frame.

In another embodiment, the series of voltages need not be converted into digital by ADCs nor processed by an ISP. The series of analog voltages may be output from sensor 16 as analog samples, in which case transmitter 28 may perform its encoding upon analog samples rather than digital samples. These analog signals are presented to the SSVT Tx circuit (28), which operates in a sampled analog fashion to implement the encoding in a mathematically identical way to the digital version. ISP (20), Video Streamer (21) and retimer (26) would not be used. In an embodiment 98, the analog voltages may also be stored directly into a storage subsystem 100a; once decoded and retrieved the analog samples may be displayed on a screen of video source 12, input into transmitter 28, sent over medium 93, converted to digital, or sent elsewhere.

The contents of a given set of samples 22 may vary since there are many ways to represent color. RGB provides three color values. With YCbCr, Y is the luminance component and Cb and Cr are the blue-difference and red-difference chroma values, respectively. YCbCr color spaces are defined by a mathematical coordinate transformation from an associated RGB color space. In yet another way to represent color, an "alternating" approach can be used. For example, every second pixel is represented by its Luminance(Y) value, while alternating pixels are represented by either Cb (Blue) or Cr (Red) values. Accordingly, in various embodiments, each set of samples 22 includes some number "S" of sample values transmitted in parallel. With RGB, the number of samples per set of samples 22 is S=3, while for YCbCr, S=2. The number of samples produced by the ISP per pixel location depends on the ISP implementation and, in particular, on the color space applied, and may be fewer than two or more than three.

The output of the video streamer 21 is a continuous stream of time-ordered sets of samples 22, each representative of a pixel in a row, from left to right, in row-major order, frame after frame, so long as the array 16 is sensing. The stream of sets of samples 22 may also be stored in a video storage subsystem 100a and subsequently transmitted to retimer 26 at any time after the video stream was initially captured by the image sensor 16.

As explained in greater detail below, retimer 26 is responsible for exposing the color component information (e.g., RGB values) from each of the sets of samples 22 in the stream generated by video streamer 21. The spread spectrum video transport transmitter (SSVT TX) 28 is then responsible for (a) distributing the set of samples 22 into one of multiple encoder input vectors using a predetermined permutation, (b) applying SSVT modulation to each of the multiple encoder input vectors, (c) encoding the multiple input vectors with SSVT coding to generate sequences of EM level signals, and (d) then transmitting the sequences of EM level signals over multiple EM pathways or a transmission medium, such as an HDMI cable, towards the video sink 14. The stream of sets of input samples 22 are distributed at a first clock rate (pix-clk) to create encoder input vectors according to a predetermined permutation. The encoded EM signals may then be transmitted over the medium at a second clock rate (SSVT_clk).

The function of the SSVT receiver (RX) 30 and the retimer 32 are the complement of the retimer 26 and SSVT transmitter 28 on the transmit side. That is, the SSVT receiver 30 (a) receives the sequences of EM analog output level signals from the multiple EM pathways of the transmission medium, (b) decodes each sequence by applying SSVT demodulation to reconstruct the video samples in multiple output vectors, and (c) collects the samples from the multiple output vectors into a reconstruction of the original stream of sets of samples 22 using the same permutation used to distribute the input samples into input vectors on the transmit side. Retimer 32 then transforms the reconstructed output samples into a format that is suitable for display by the video sink 14. The number of output sample values S in each set of samples 22 is determined by the color space applied by the video source. With RGB, S=3, and with YCbCr, S=2.

According to various embodiments of the invention, the encoded samples may be stored for any length of time within any of video storage subsystems 100a, 100b, 100c, 100d, or within two or more of these subsystems before eventual display upon video sink 14. In a first embodiment 92, storage subsystem 100a may be located anywhere between the video source 12 and the video sink 14 such that digital samples 22 are transmitted in a digital fashion 93 as is known in the prior art to storage system 100a, encoded and then stored directly into subsystem 100a for any length of time before being read and output again as digital samples 22 for delivery to video sink 14. Embodiment 92 may include storage upon a cloud storage service provider such as a content provider, etc.

Figure 6:
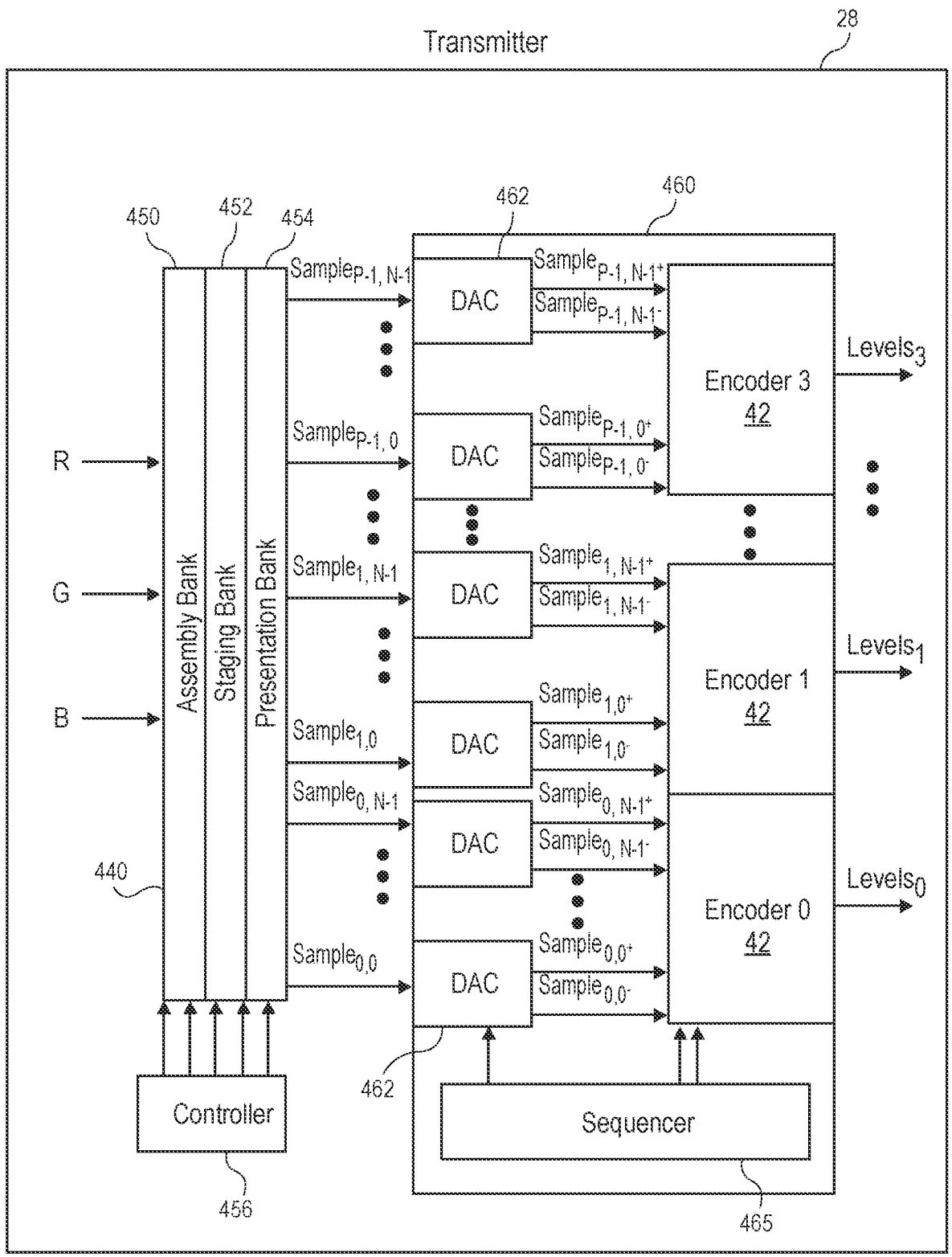
FIG. 6 is a block diagram of SSVT transmitter.

In a second embodiment 94, storage subsystem 100a may be located at the video source such that samples are encoded and stored directly into subsystem 100a for any length of time before being read and output over conventional digital transport 93 or via retimer 26 for transmission over transmission medium 34. In a third embodiment 96, even once the samples 22 are received at video sink 14, they may also be encoded and stored directly into a subsystem 100a for any length of time before being read and displayed on video sink 14. In these first, second and third embodiments, the N samples may be derived from a media signal and presented to the storage subsystem in any suitable manner. The manner of deriving the samples will depend upon the type of samples (e.g., color video samples, black and white video samples, sound samples, LIDAR samples, etc.); in one particular embodiment, the transmitter of FIG. 6 shows one technique for presenting N samples to an encoder based upon an RGB video signal.

In a fourth embodiment, storage subsystem 100b is integrated with transmitter 28 such that analog levels output from one or more encoders (i.e., the SSVT signal) via path 52 are stored directly into subsystem 100b (and not transmitted directly over transmission medium 34) for any length of time before being read and output via path 54 for transmission over transmission medium 34.

In a fifth embodiment, encoded samples from one or more encoders of transmitter 28 (i.e., the SSVT signal) are output directly onto transmission medium 34 and then at some intermediate location, this SSVT signal is stored into subsystem 100c via path 62 for any length of time before being read and output via path 64 for continued transmission over medium 34.

In a sixth embodiment, storage subsystem 100d is integrated with receiver 30 such that analog levels output from one or more encoders (i.e., the SSVT signal) via path 72 are stored directly into subsystem 100d (and not input directly into receiver 30) for any length of time before being read and output via path 74 for input into receiver 30 for decoding back into substantially the same samples input into transmitter 28.

In a seventh embodiment 98 a video storage subsystem 100a receives analog levels directly from a sensor of a video source (e.g., a still camera, video camera, etc.) without the need for any ADCs, stores the analog levels for a period of time, decodes the analog levels using at least one decoder into the original samples, and then displays the samples (e.g., as an image, photograph or video) on a display of the camera, outputs the samples to be encoded and transmitted as an SSVT signal, transmits the samples over a communication medium, etc. The analog samples output from the storage subsystem may also be converted into digital form using any number of ADCs and then transmitted from the source device in digital form, stored in digital form, etc. In one particular embodiment, the analog levels are stored onto a memory card or chip of the source device (e.g., a digital camera), the card typically being removable and non-volatile. Or, the analog levels are stored into a non-removable (by the consumer) memory of the source device, volatile or non-volatile.

In an eighth embodiment 99 the analog voltages are sent to transmitter 28 directly from the sensor 16 and analog encoding is used, as is described herein and shown in FIG. 1. The transmitter 28 (along with its encoders) may be located within the video source (not shown) or separate from the video source as shown.

Transmitter with Encoders and Storage, Receiver with Decoders

Figure 2:
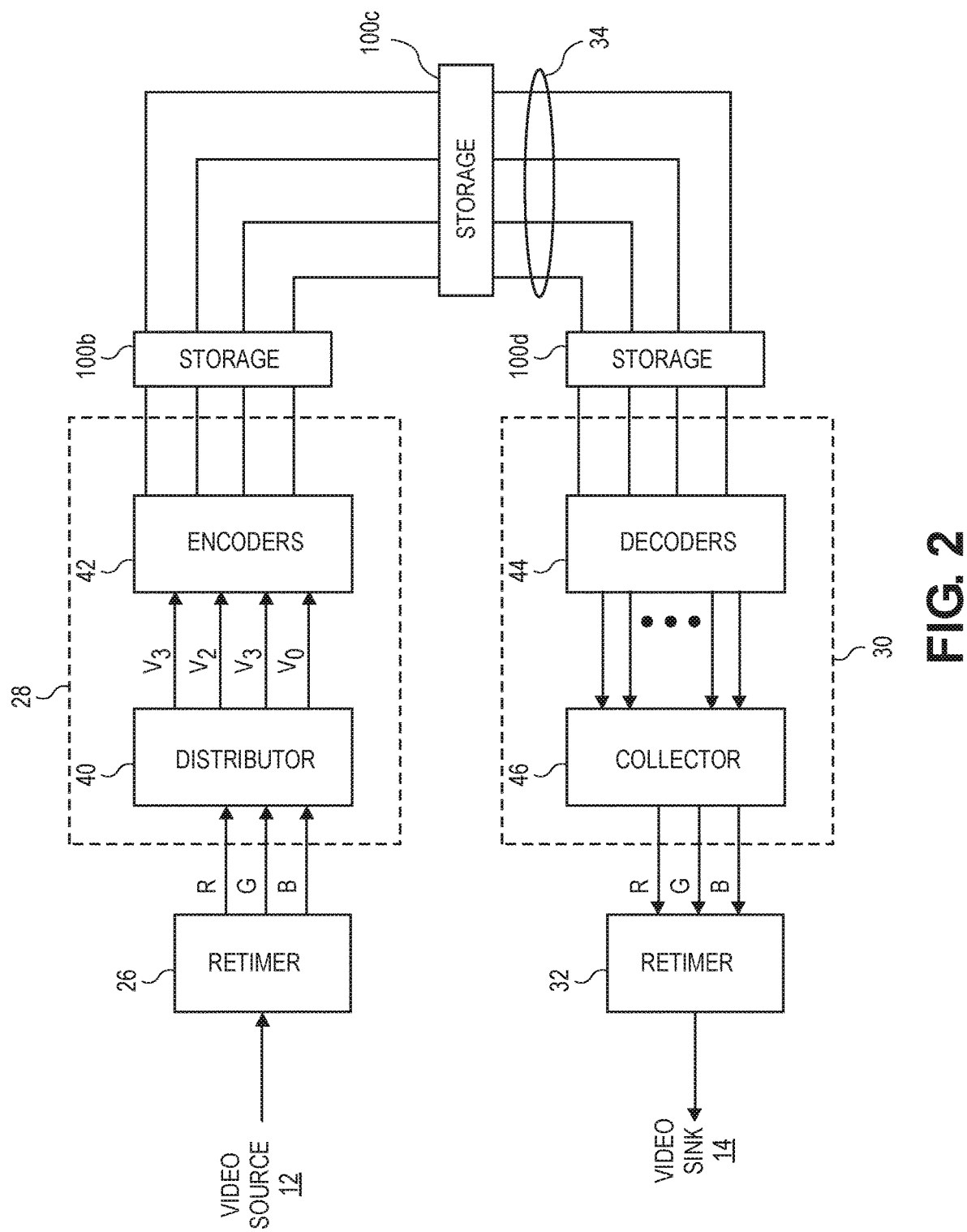
FIG. 2 is a logic block diagram of a Spread Spectrum Video Transmission (SSVT) transmitter and SSVT receiver connected by a transmission cable.

FIG. 2 is a block diagram of the SSVT transmitter 28 and SSVT receiver 30 connected by a transmission medium 34. The SSVT transmitter 28 includes a distributor 40 and multiple encoders 42. The SSVT receiver 30 includes multiple decoders 44 and a collector 46. As will be explained in greater detail below, there may only be one encoder and one decoder, and a distributor and collector are not strictly necessary.

Distributor 40 of the SSVT receiver 30 is arranged to receive the color information (e.g., R, G, and B values) exposed in the input sets of samples 22. In response, the distributor 40 takes the exposed color information for the incoming sets of samples 22 and builds multiple encoder input vectors according to a predefined permutation. In the embodiment shown in FIG. 2, there are four encoder input vectors ($V_0$, $V_1$, $V_2$ and $V_3$), one for each of four EM pathways on the transmission medium 34 respectively. One of the multiple encoders 42 is assigned to one of the four vectors $V_0$, $V_1$, $V_2$ and $V_3$ respectively. Each encoder 42 is responsible for encoding sample values contained in the corresponding encoder input vector and generating an EM signal that is sent over one of the parallel pathways on the transmission medium 34. Transmission medium 34 may be a cable such as HDMI, optical fiber or wireless. The number of pathways on the transmission medium 34 may range from one to any number more than one.

One possible permutation implemented by the distributor 40 for building four vectors $V_0$, $V_1$, $V_2$ and $V_3$ will now be described. In this example, each of the vectors includes N samples of color information and RGB is used. The exposed RGB samples of the sets of samples 22 are assigned to vectors $V_0$, $V_1$, $V_2$ and $V_3$ from left to right. In other words, the "R", "G" and "B" values of the left most sample and the "R" signal of the next set of samples 22 are assigned to vector $V_0$, whereas the next (from left to right) "G", "B", "R" and "G" values of the next sample 22 are assigned to vector $V_1$, the next (from left to right) "B", "R", G" and "B" values are assigned to vector $V_2$, and the next (from left to right) "R", "G", "R" and "R" values are assigned to vector $V_3$. Once the fourth vector $V_3$ has been assigned its signals, the above process is repeated until each of the four vectors $V_0$, $V_1$, $V_2$ and $V_3$ have N samples.

Assume N=60. In this case, the total number of N samples included in the four vectors $V_0$, $V_1$, $V_2$ and $V_3$ is 240. The four encoder input vectors $V_0$, $V_1$, $V_2$ and $V_3$, when completely built up, include the samples (where S=3) for 80 distinct sets of samples 22 (240/3=80). In other words, vector $V_0$ includes $Sample_{0,0}$ through $Sample_{0,N-1}$ and vector $V_1$ includes $Sample_{1,0}$ through $Sample_{1,N-1}$, etc. It should also be understood that the permutation scheme used to construct the vectors, regardless of the number, is arbitrary. Any permutation scheme may be used, limited only by whichever permutation scheme that is used on the transmit side is also used on the receive side.

Shown also are the various video storage subsystems 100b (integrated with one or more encoders 42), 100c (located anywhere upon transmission medium 34), and 100d (integrated with one or more decoders 44). Not shown in this figure are storage subsystems 100a which receive a stream of samples (digital or analog), encode the samples, store the samples as analog levels, and then decode the stored samples at a later time for transmission.

Storage Subsystems

In the below examples the storage subsystems store encoded video samples, although samples representing other types of information are contemplated.

Figure 3A:
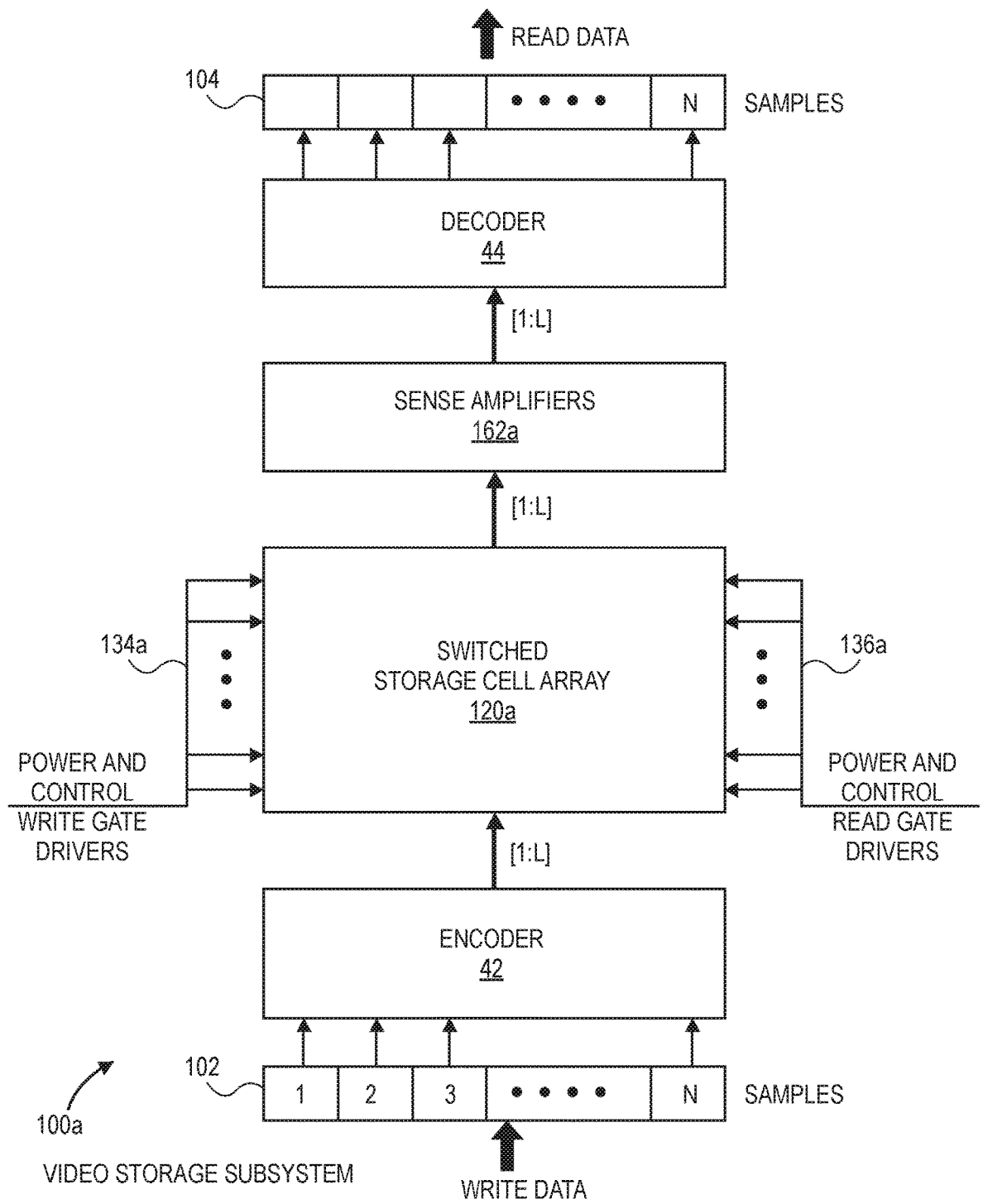
FIG. 3A is a block diagram of a storage subsystem with one encoder.

FIG. 3A is a block diagram of a storage subsystem 100a with one encoder 42, although more encoders are possible. Samples 102 are N samples of information from many suitable source, such as from a video source and are input in parallel into encoder 42 as is herein described, and maybe analog or digital samples. Storage 100a is integrated with the output of encoder 42 in that the parallel output of L analog levels from the encoder may be directly stored into the switched storage cell array as will be described in greater detail below. Included within the storage subsystem is a switched storage cell array 120a whose write gate drivers 134a and read gate drivers 136a receive power and control from an address decoder, or from a suitable controller, such as from a GPU, etc.

Although these signals are shown as entering the array from its sides, any suitable configuration may be used as known to those of skill in the art, depending upon the implementation. Depending upon whether the storage subsystem is located at a video source, a video sink, or at a content provider, these power and control signals may come from the video source (e.g., the camera or sensor system), the video stream itself (in the case of remote storage), or from the playback logic that steps through the samples (in the case of a video sink upon playback). In any case, control will typically be local.

The encoder 42 outputs L analog output levels directly into the storage array 120 upon enabling by the write gate drivers 134a. In a similar fashion, the storage array 120a outputs the stored L analog output levels upon enabling by the read gate drivers 136a. Sense amplifiers 162a may be used on each output data line of the array 120a in order to amplify the stored analog level as needed as is known to those of skill in the art. The L analog output levels are output directly into the decoder 44 which then outputs an output vector 104 of N samples which are substantially the same as samples 102 input to the encoder. The type of signals driven into and read out of the array will depend upon the type of storage cell chosen. This design choice may be made by those skilled in the art, for example, the use of floating gate NVROM might entail the use of a parametric shift of transistor performance. Types of storage cells that may be used include: flash memory, EPROMS, phase-shift memory and any other methods of storing continuously varying analog samples.

Figure 3B:
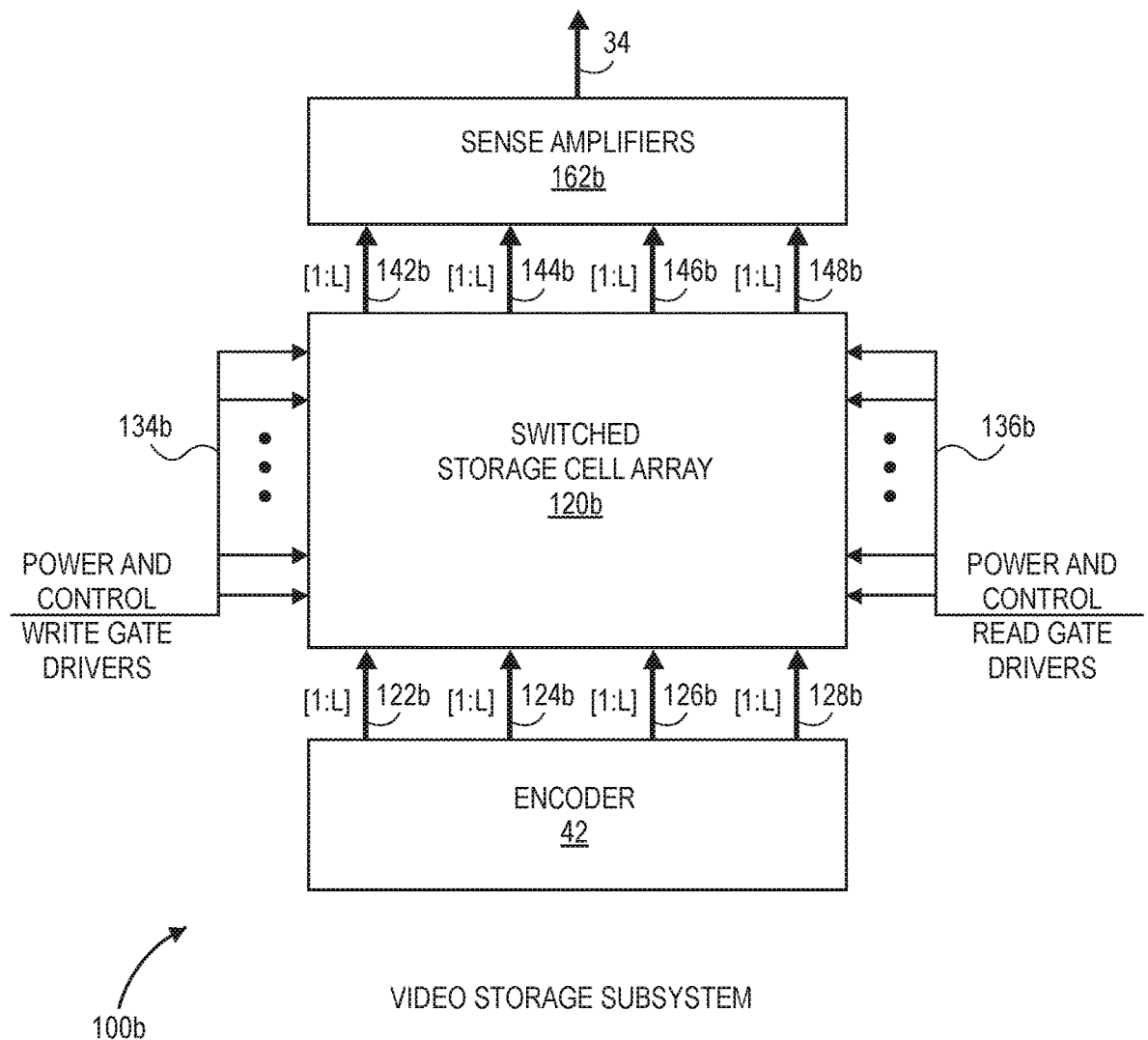
FIG. 3B is a block diagram of a storage subsystem along with any number of encoders.

FIG. 3B is a block diagram of a storage subsystem 100b along with any number of encoders 42. In this example the storage subsystem stores encoded video samples, although samples representing other types of information are contemplated. Storage 100b is integrated with the output of encoders 42 in that the parallel output of each of L analog levels from each encoder may be directly stored into the switched storage cell array as will be described in greater detail below. Included within the storage subsystem is a switched storage cell array 120b whose write gate drivers 134b and read gate drivers 136b receive power and control from an address decoder, or from a suitable controller, such as from a GPU, etc. Although these signals are shown as entering the array from its sides, any suitable configuration may be used as known to those of skill in the art, depending upon the implementation.

In this example, there are four encoders, each outputting L analog output levels 122b-128b directly into the storage array 120b upon enabling by the write gate drivers 134b. In a similar fashion, the storage array 120b outputs the stored L analog output levels 142b-148b upon enabling by the read gate drivers 136b. Sense amplifiers 162b may be used on each output data line of the array 120b in order to amplify the stored analog level as needed as is known to those of skill in the art. Finally, the L analog output levels 142b-148b are output serially onto the transmission medium 34 for transport to a video sink as has been described above. A sense amplifier amplifies a stored analog level, and these levels are output sequentially as known to those skilled in the art.

Figure 3C:
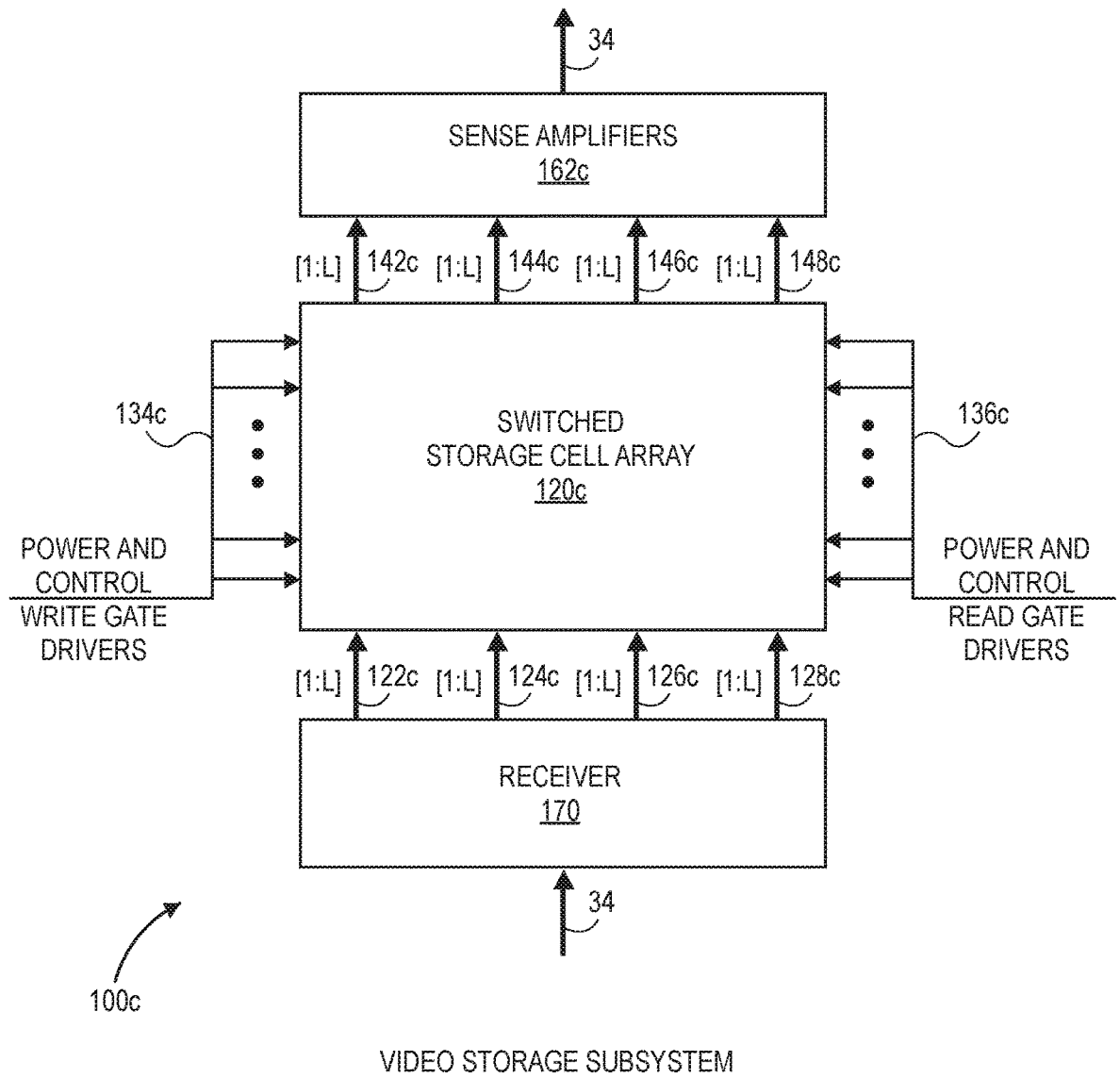
FIG. 3C is a block diagram of a storage subsystem.

FIG. 3C is a block diagram of a storage subsystem 100c. Storage 100c may be located at any point along transmission medium 34 (i.e., between transmitter 28 and receiver 30) and stores the L analog output levels per encoder received from the transmission medium 34 for any length of time before retransmitting these L levels onto the transmission medium. For example, storage 100c may be used to implement a continuous loop playback device.

Included within the storage subsystem is a switched storage cell array 120c whose write gate drivers 134c and read gate drivers 136c receive power and control from an address decoder, or from a suitable controller, such as from a GPU, etc. Although these signals are shown as entering the array from its sides, any suitable configuration may be used as known to those of skill in the art, depending upon the implementation. In this example, the SSVT signal originated from four encoders, each outputting L analog output levels onto the transmission medium 34, which may be received by a receiver 170 located at the storage array 120c.

Accordingly, output from receiver 170 will be L analog levels per encoder 122c-128c directly into the storage array 120c upon enabling by the write gate drivers 134c. In a similar fashion, the storage array 120c outputs the stored L analog output levels 142c-148c upon enabling by the read gate drivers 136c. Sense amplifiers 162c may be used on each output data line of the array 120c in order to amplify the stored analog level as needed as is known to those of skill in the art. Finally, the L analog output levels 142c-148c are output serially onto the transmission medium 34 for continued transport to a video sink as has been described above.

Figure 3D:
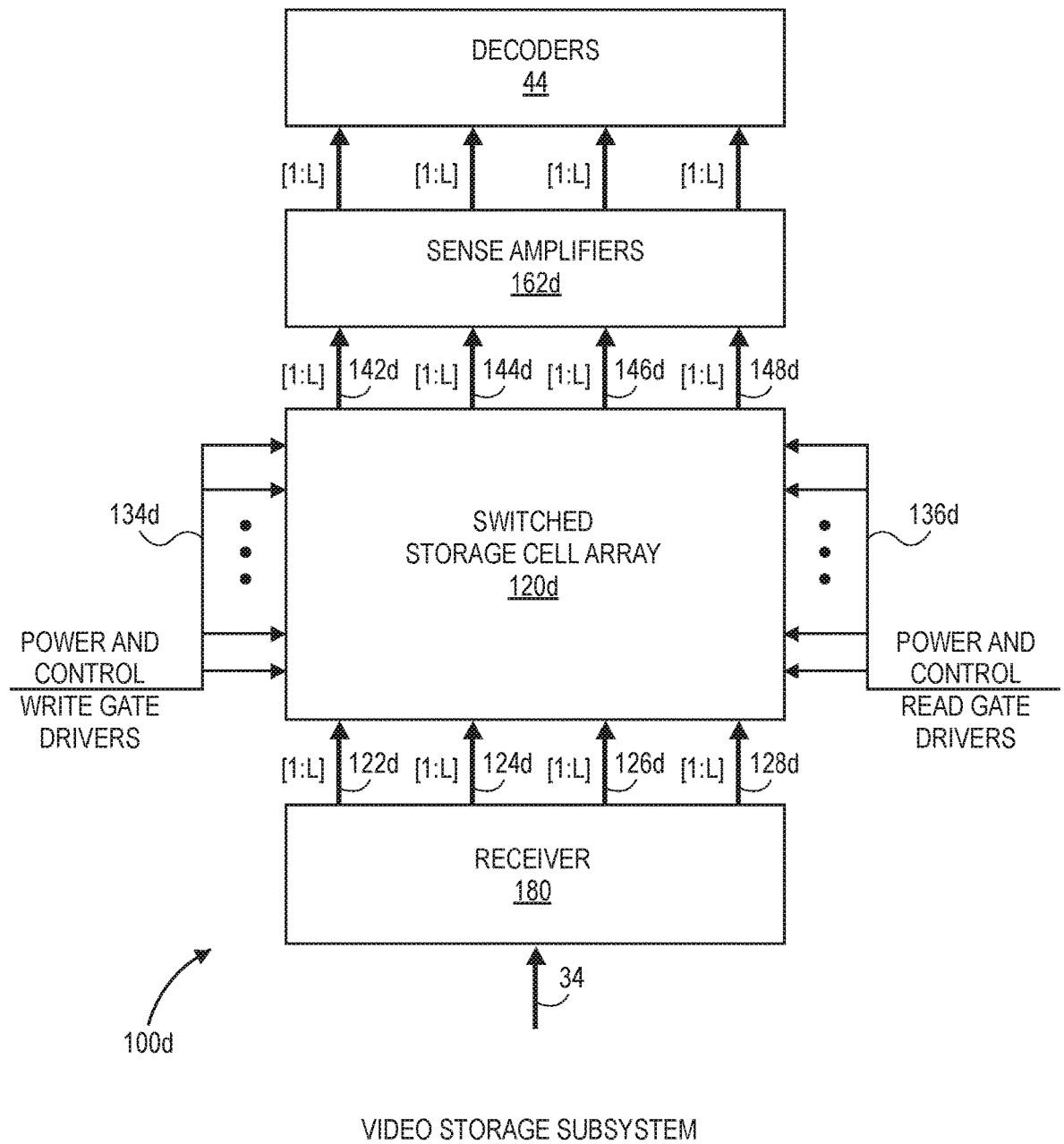
FIG. 3D is a block diagram of a storage subsystem along with any number of decoders.

FIG. 3D is a block diagram of a storage subsystem 100d along with any number of decoders 44. Storage 100d is integrated with the input to decoders 44 in that the parallel output of each of L analog levels from the switched storage cell array is input directly into each decoder as will be described in greater detail below. Included within the storage subsystem is a switched storage cell array 120d whose write gate drivers 134d and read gate drivers 136d receive power and control from an address decoder, or from a suitable controller, such as from a GPU, etc. Although these signals are shown as entering the array from its sides, any suitable configuration may be used as known to those of skill in the art, depending upon the implementation.

In this example, the SSVT signal originated from four encoders, each outputting L analog output levels onto the transmission medium 34 which may be received by a receiver 180 located at the storage array 120d. Accordingly, output from receiver 180 will be L analog levels per encoder 122d-128d directly into the storage array 120d upon enabling by the write gate drivers 134d. In a similar fashion, the storage array 120d outputs the stored L analog output levels 142d-148d upon enabling by the read gate drivers 136d. Sense amplifiers 162d may be used on each output data line of the array 120d in order to amplify the stored analog level as needed as is known to those of skill in the art. Finally, the L analog output levels 142d-148d are output directly into the four decoders 44 as will be described in greater detail below.

Figure 11A:
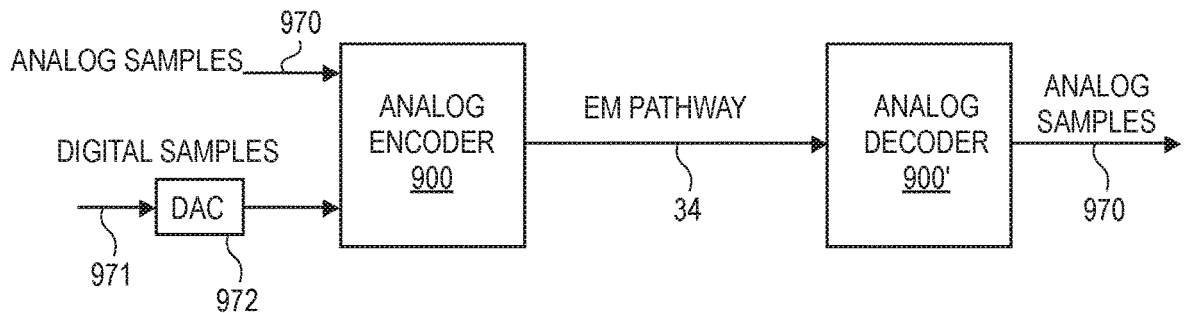
FIG. 11A illustrates use of an analog encoder and a corresponding analog decoder.
Figure 11B:
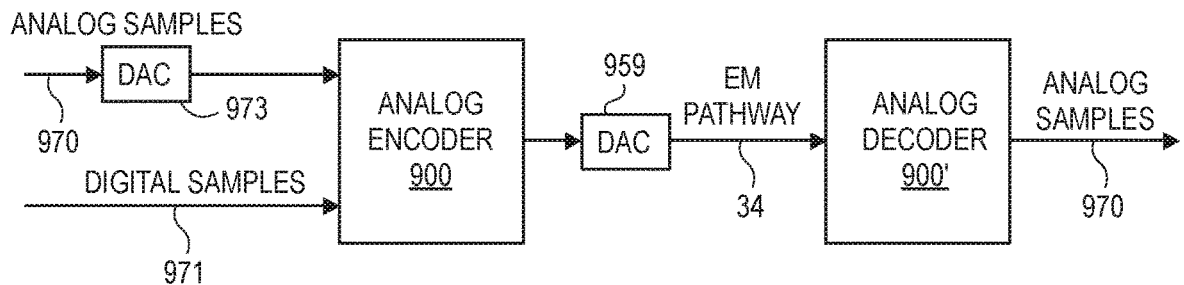
FIG. 11B illustrates use of a digital encoder and a corresponding analog decoder.
Figure 11C:
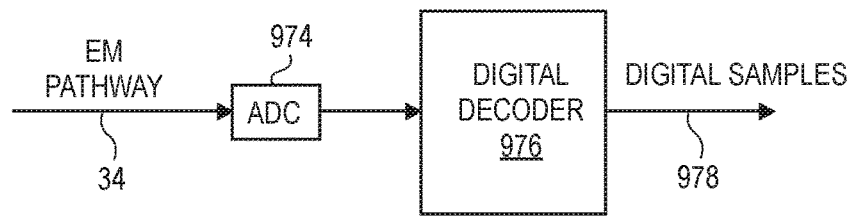
FIG. 11C illustrates use of a digital decoder to decode encoded analog signals that have arrived over an electromagnetic pathway on transmission medium.

Further, as described herein and is shown at FIGS. 11A-11C, the encoding and decoding in any of the above storage subsystems may be analog encoding and decoding or digital encoding and decoding. If the encoding is digital, then at least one digital-to-analog converter is used to convert the output levels into analog levels for storage into the storage array.

Switched Storage Cell Array

Figure 4:
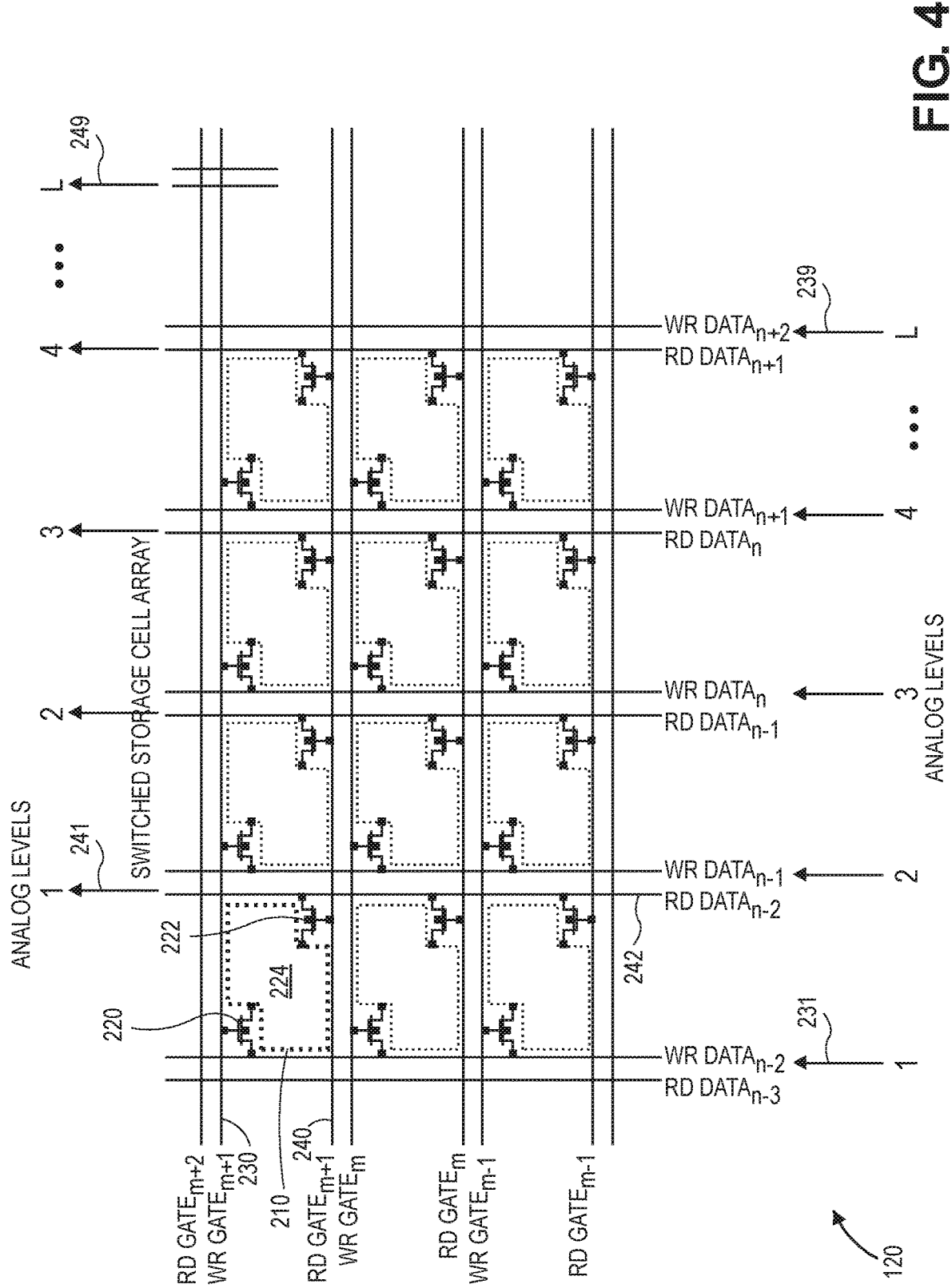
FIG. 4 illustrates a switched storage cell array suitable for implementing any of the storage arrays.

FIG. 4 illustrates a switched storage cell array 120 suitable for implementing any of the storage arrays 120a, 120b, 120c, or 120d. Storage array 120 may be any suitable storage array as is well known in the art. For instance, array 120 may be non-volatile storage such as flash memory useful for long-term storage of samples, or may be volatile storage such as DRAM. If DRAM is used, and then a refresh circuit is required as is known in the art.

This example illustrates a simple embodiment in which only one encoder and one decoder are used, resulting in an output of L analog levels. Accordingly, as shown, L analog levels 231-239 (from an encoder 42, from receiver 170 or from receiver 180) are input onto the write data lines of the array. Upon a read, L analog levels 241-249 are output onto the read data lines of the array. Storage cell 210 operates as is known in the art, that is, when the write gate driver 230 is enabled write data on line 231 is stored into cell 210 (as is the other write data in corresponding storage cells that are also enabled by driver 230). Upon a read, read gate driver 240 is enabled and the analog value of cell 210 may be read on line 241 (as may the analog values of other corresponding storage cells also enabled by driver 240).

In this particular embodiment transistors 220 are floating gate MOSFET transistors. Each storage cell region 224 is arranged to store an analog value and may include a charge storage area in the gate of a transistor (or other circuitry) to store the analog value. In one particular embodiment of the present invention, the analog voltage value stored in region 224 ranges from 0 volts up to about 1 V, although other analog voltage ranges are possible.

As shown, storage array 120 has L columns, although widths of 2L, 3L, and 4L columns and greater may also be used. The number of rows used in the storage array may be of any number and will dictate the storage capacity of the array. Typically, there will be one storage array for each encoder, and if the width of the storage array is 2L, 3L or greater, then additional addressing circuitry will be needed in order to route sets of L analog levels output from the encoder on to the appropriate set of L columns. Further, no matter the width of the storage array, if there are multiple encoders using only a single storage array, again additional addressing circuitry will be needed in order to route the L analog levels output from each encoder to the appropriate set of L columns. Such addressing circuitry and multiplexing techniques are known to those of skill in the art. In addition, it is possible to interleave the outputs of multiple encoders writing into a single storage array such that each encoder writes into a different row simultaneously, requiring more column wires. Each of these possibilities for design of the storage array depends upon the specific implementation and involves the optimization of circuitry versus memory density, etc., and will be a design choice by the designer.

Storage Array Integrated with Encoder or Decoder

Figure 5A:
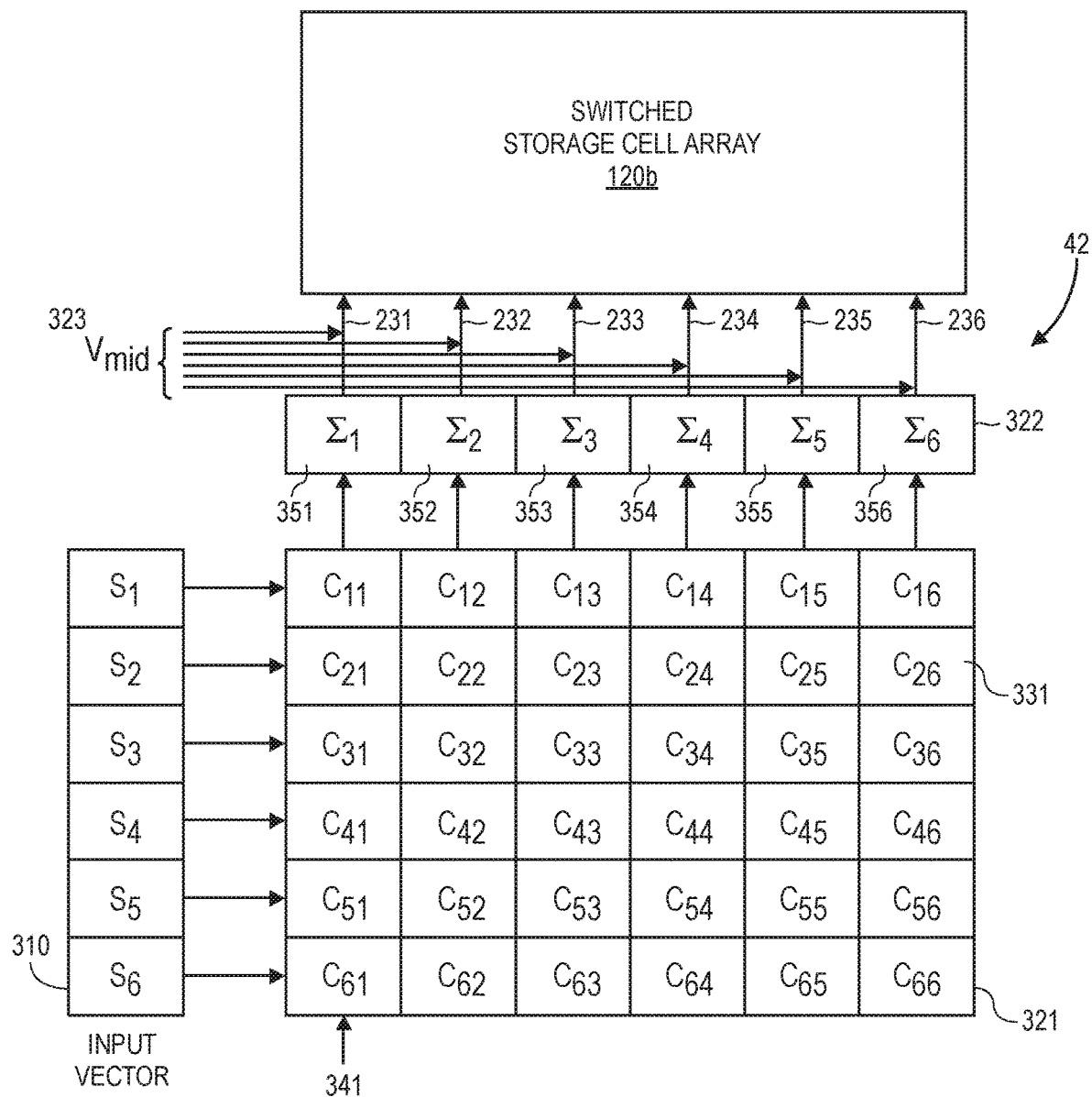
FIG. 5A is a block diagram of an analog encoder integrated with a storage array.

FIG. 5A is a block diagram of an analog encoder integrated with a storage array. Shown is an input vector 310 of samples, a codebook 321 each code having a length L (in this case, L=6), an accumulator 322, a level shifter 323, and storage array 120b. Preferably, L>=N>=2.

Each of the codebook values (e.g., value 331, also referred to as "chips") are modulated by the samples $S_1$-$S_6$ corresponding to a particular row of the codebook (e.g., sample $S_1$ modulates chips in the first row). Samples $S_1$-$S_6$ may be analog voltages such as those output from a DAC 62 in FIG. 6. In this example, the incoming sample values are multiplied onto the stored chips at their respective locations of codebook 321. This function is implemented using multipliers (not shown).

Accumulator 322 is provided to produce the sum of all tracks across the codebook to form an analog output level (e.g., modulated values in column 341 are summed to produce an output level by accumulator 351). Accumulator 222 may include conventional circuitry to add column values per clock cycle. A level shifter 323 may be provided to add additional voltage, such as a mid-range voltage, to each output of the accumulator, i.e., a mid-range voltage value ($V_{mid}$) adds additional voltage to each analog output of accumulator 322. The mid-range voltage may be added per clock cycle to ensure that the outputs on lines 231-236 of encoder 42 (e.g., $level_0$ . . . $level_{L-1}$) are within the expected range. The output on lines 231-236 is then input directly into the write data lines of storage array 120 as shown in FIG. 4.

In an alternative embodiment, Samples $S_1$-$S_6$ are digital representations and digital encoding may be used. In this embodiment, and as mentioned earlier, the samples originating at video source 12 of FIG. 1 may have been converted into a digital representation using ADC 18, and when DACs are not used within transmitter 28 (or before) then the samples in input vector 310 are digital values. Accordingly, the modulation and summation of FIG. 5A is a digital encoding and the results of accumulator 322 are digital values. Therefore, in this alternative embodiment, a digital-to-analog converter (DAC, not shown) is placed at the output of each individual accumulator 351-356 in order to convert its digital summation of its column into an analog value to be placed upon one of lines 231-236.

Figure 5B:
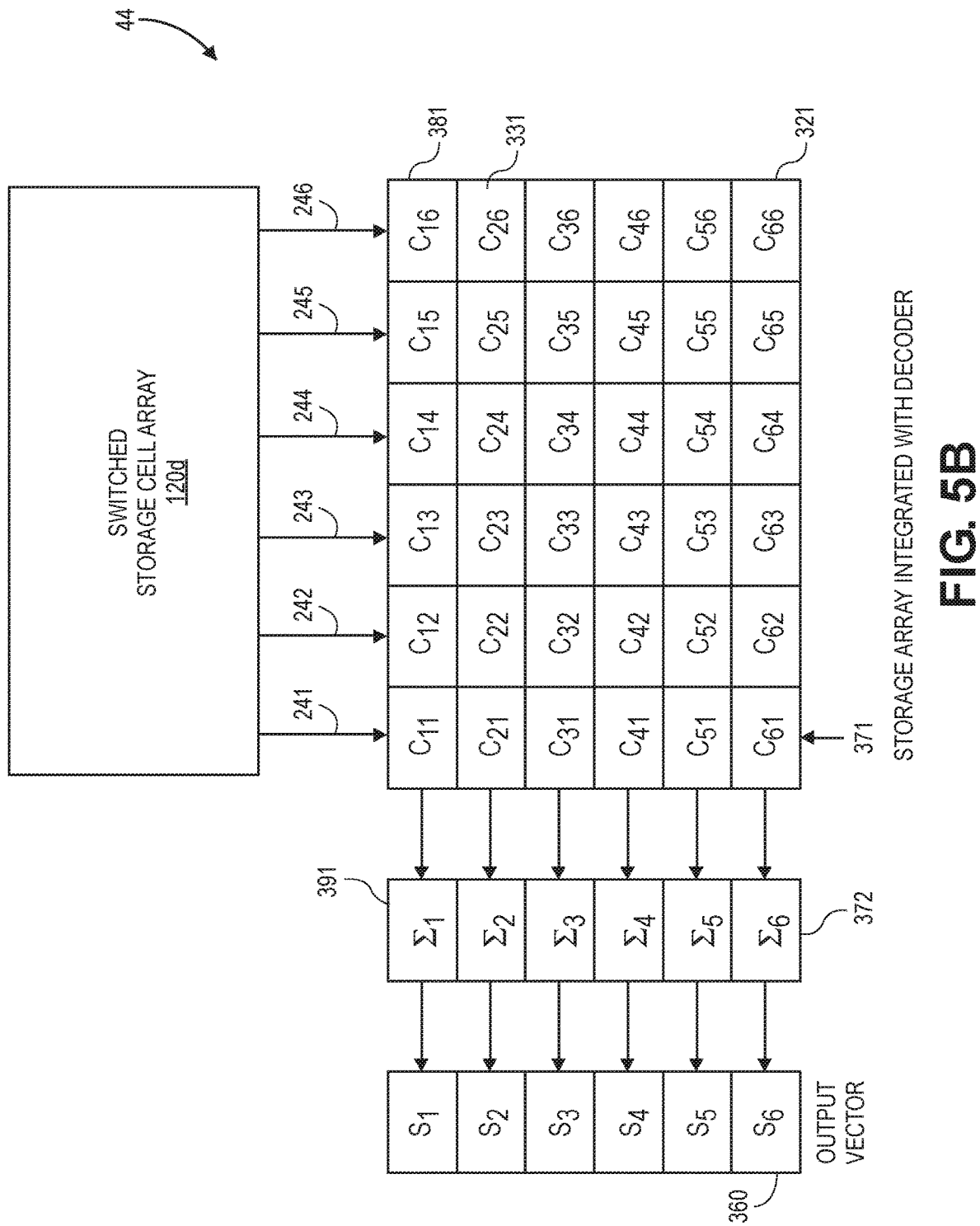
FIG. 5B is a block diagram of an analog decoder integrated with a storage cell array.

FIG. 5B is a block diagram of an analog decoder integrated with a storage cell array. Shown is an output vector 360 of samples, a codebook 321 each code having a length L (in this case, L=6), an accumulator 372, and storage array 120d. In Preferably, L>=N>=2.

Each of the codebook values (e.g., value 331, also referred to as "chips") are modulated by the incoming analog levels 241-246 that are read directly from storage array 102d, each of the analog levels modulating a single column of the codebook, e.g., analog level 241 modulates each of the chips in column 371. In this example, the incoming analog levels are multiplied onto the stored chips at their respective locations of codebook 321. This function is implemented using multipliers (not shown).

Accumulator 372 is provided to produce the sum across one row of the codebook to form a sum (e.g., modulated values in row 3 are summed to produce a value by accumulator 391). Accumulator 372 may include conventional circuitry to add row values per clock cycle. The output from accumulator 372 then becomes output vector 360 holding the original samples from input vector 310.

In an alternative embodiment, the analog levels output from storage 102d may be converted to digital representations and digital decoding may be used. Therefore, in this alternative embodiment, an analog-to-digital converter (ADC, not shown) is placed at the output of each line 241-246 from the storage array 102d in order to convert its analog level into a digital value which is then used to modulate its corresponding column of the codebook. Accordingly, the modulation and summation of FIG. 5B is a digital decoding and the results of accumulator 372 and the samples in output vector 360 are digital values.

Storage Cell Architecture—Sentinel Cells and Track

One embodiment of a storage cell array incorporates a "sentinel" track of L analog levels storing a known sample value across the storage cells in order to monitor leakage in the storage cells of the array (after retrieval and decoding) and then to compensate by applying compensating gain as part of the read-out circuit to the sentinel track and it's companions. The stored values in the sentinel cells are read back during the reading of the array in order to adjust the other stored values (after retrieval and decoding) for various imperfections. These cells may be written based upon the maximum and minimum values permitted for the samples in an input vector. Reference will be made to FIGS. 5A and 5B.

As known in the art, an analog level stored at a cell within the storage array may drift and become attenuated over time (an amplitude change, also referred to as droop, e.g., a cell may lose, by way of example, 80% of an initial stored value-1 volt becomes 0.8 volt), analog levels may become offset over time (a base level shift, e.g., each stored level drops by 0.1 volt-4 volts becomes 3.9 volts, 2 volts becomes 1.9 volts, etc.), or both attenuation and offset may occur, although attenuation is more common in most storage cells. As it is desired to recover the actual values of the samples in an input vector 310 as closely as possible after those samples have been encoded, stored within a storage cell array, and then decoded into an output vector 360 (i.e., samples $S_1$-$S_6$ of output vector 360 should be equivalent to samples $S_1$-$S_6$ of output vector 360), a technique of implementing sentinel tracks within a storage array is advantageous.

Figure 13:
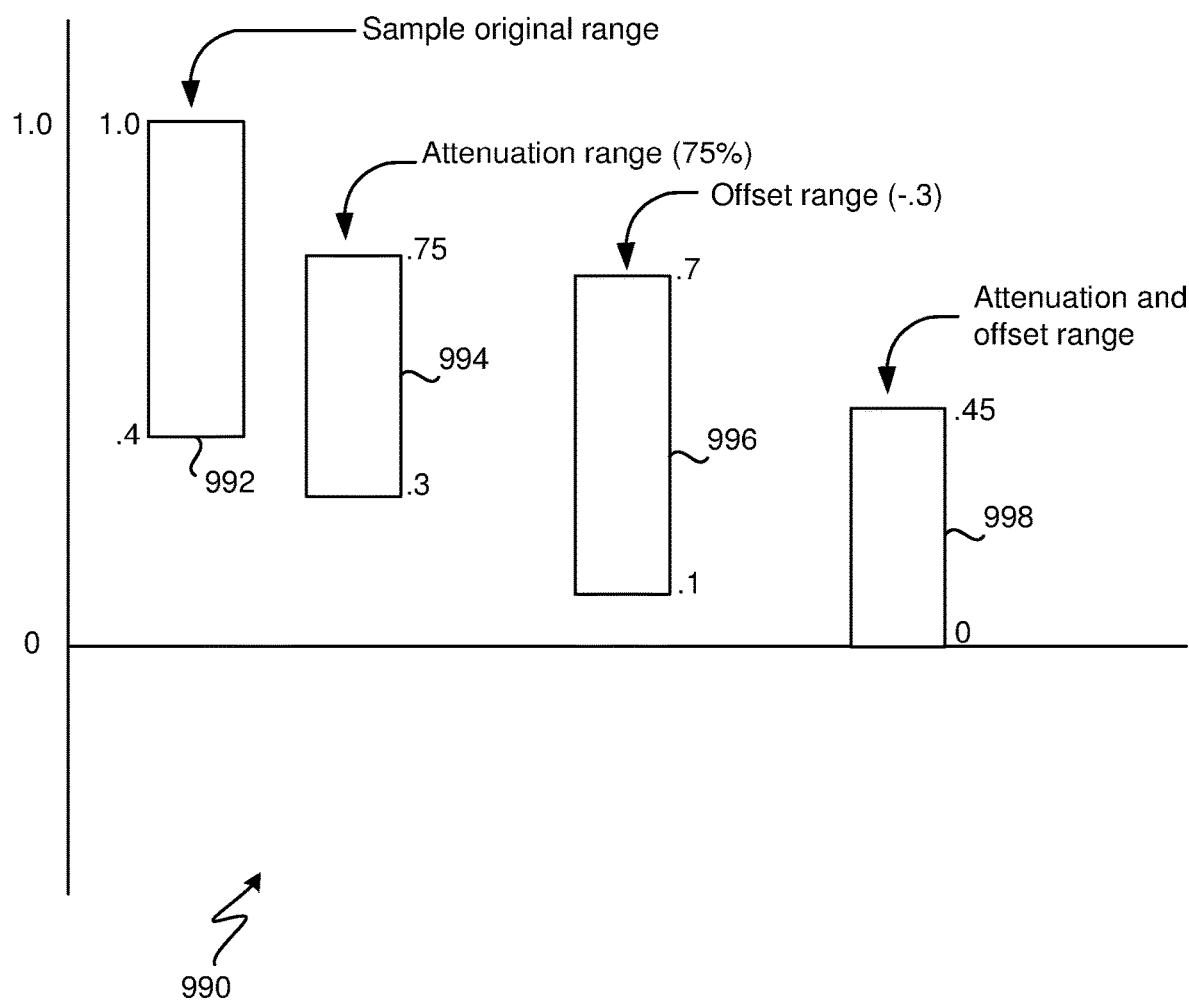
FIG. 13 illustrates attenuation and offset examples.

FIG. 13 illustrates the effects of both attenuation and offset. Shown is a graph 990 showing a range 992 of possible values for samples in an input vector (of course, other values and ranges are possible, including negative values), ranging from 0.4 up to 1.0. If only attenuation occurs in the storage array, and the sentinel sample attenuates 75%, then the possible range 994 of a decoded sentinel sample is from 0.3 up to 0.75. Thus, if the sentinel sample in the input vector is set to 1.0, and the resulting sentinel sample is 0.75, then an attenuation of 75% has occurred.

If only offset occurs in the storage array, and a sample is reduced by 0.3, then the possible range 996 of a decoded sentinel sample is from 0.1 up to 0.7. Thus, if the sentinel sample in the input vector is set to 1.0, and the resulting sentinel sample is 0.7, then an offset of 0.3 has occurred.

If both attenuation and offset occur in the storage array, and the attenuation of the sentinel sample is 75% and the offset of the sample is 0.3, then the possible range 998 of a decoded sentinel sample is from 0 up to 0.45. Thus, if the sentinel sample in the input vector is set to 1.0, and both attenuation and offset have occurred, then the resulting sentinel sample is 0.45. How to determine if both have occurred will be explained below.

In a first embodiment, assuming that the allowed sample values in input vector 360 range from −1 volt to +1 volt, one of the samples, e.g., S6, is set equal to +1 volt, thus becoming a "sentinel" sample value. Once encoding is performed upon input vector 310 ($S_1$-$S_6$ each modulates their respective tracks in the codebook and summation produces outputs 231-236 to be stored as L analog levels in the array), these L analog levels stored in L cells in the array function as a sentinel "track" in the storage array. Any attenuation or offset affecting cells in the array will necessarily affect cells in this sentinel "track", thus affecting the eventual output of S6 in output vector 360. Once decoding occurs, the receiver can detect if $S_6$ is in fact+1 volt. Setting of one of the sample values may occur at the storage subsystem immediately before encoding, may occur at a video source, or at any other suitable location, and will depend upon which embodiment is used and a design decision. Moreover, setting of the sentinel sample value may include replacing an actual sample value from a source with the known value, inserting the known value at a video source, or any other suitable technique.

Advantageously, instead of simply measuring the drift of a single cell within the storage array, this technique determines the drift of L cells within an array, thus providing a better average measure of the drift of the other cells within the array. More than one sentinel sample (and thus more than one sentinel track) may be used to increase sensitivity to drift or to detect offset, as explained below. A single sentinel track can correct for a single "variable" i.e., attenuation or offset as discussed above) whichever is dominant. If the corruption of the cells involves both an attenuation and an offset then there will be a need for two sentinel tracks. And for those skilled in the art, the trend to higher numbers of sentinel tracks with higher order corrections will be obvious.

The receiver 530 has a priori (i.e., known ahead of time) knowledge that this particular sample should have a value of +1 volt after decoding, i.e., sample S6 of output vector 360 should also be +1 volt. In other words, the receiver knows what the expected value of this sample should be in order to compare that value to the actual value of the sample received. The expected value may be stored in a single reference location at the storage subsystem, stored at the video source, stored at the video sink, at the transmitter, at the receiver, etc. It is a design decision where to store this reference within system 10 and how the receiver accesses this reference location in order to perform the comparison of the received value with the expected value.

Identification of which particular sample in which input vector is the sentinel sample may also be performed in different manners. By way of example, it may be known a priori (i.e., known ahead of time) that the sentinel sample shall be the first sample in the first input vector, the last sample, may be the first sample in the last input vector, or some other identified sample in one of the input vectors known to both the transmitter and receiver. Preferably, this knowledge is known ahead of time (i.e., before the samples are transmitted and received), but may also be transmitted in real time to the receiver using any suitable technique. Of course, the minimum of −1 volt may also be used as the value of the sentinel sample. Other values between the maximum and minimum values may also be used, although the maximum or minimum are preferred as sentinel sample values because they will provide the highest fidelity in coming up with a compensation adjustment for the other samples. Simply put, a larger signal (i.e., a sentinel sample value) will droop more and thus be more easily detected.

If the receiver determines that the sentinel sample value has become attenuated (e.g., $S_6$ of output vector 360 is 0.8 volts when it should be +1 volt), then all sample values in the output vector may be scaled in order to return to their original values. For example, the scale factor by which each sample in the output vector shall be multiplied may be the ratio of (expected sentinel sample value/actual sentinel sample value in output vector), e.g., +1 volt/.8 volt=1.25. In this example, then, scaling each sample in the output vector by 1.25 results in each sample of the output vector being returned to an equivalent to the original sample value of the input vector. It is also possible (although unlikely) that the sentinel sample will increase in value after storage in the storage cell array, however, use of the above scale factor will reduce the samples to the correct values.

Further, comparison of the expected sample value with the actual received sample value and application of the scale factor (or application of an offset, as described below) may be performed in any suitable location within system 10 and may depend upon the embodiment or a design choice. By way of example, comparison and application may occur within a storage subsystem 100a after decoding, within subsystem 100d after decoding, within receiver 530 after decoding, at video sink 14, or at any intermediate location on path 22, or on any path by which the output of a storage subsystem is transmitted. In fact, the comparison and application of scale factor (or offset, or both) may occur at different locations.

In a second embodiment if it suspected or known that only offset will occur within the storage array, and the decoded sample is less than the expected sample value, then the offset may be compensated for by adding the difference to all samples that have been stored in the array. By way of example, if the sentinel sample value is expected to be +1 volt and the decoded sentinel value is 0.7 volt, then an offset of −0.3 volts has occurred in the storage array and +0.3 volts may be added to each decoded sample value in order to compensate for the negative offset. It is also possible, although less likely, that a positive offset has occurred in which case a negative offset will be added to each decoded sample from the storage array.

In a third embodiment, two or more sentinel samples are used in an input vector (or in two different input vectors) resulting in two different sentinel tracks stored within the storage array. Upon reading of the storage array and decoding, these two sentinel samples may be compared to double check any detected attenuation, or to average the two scaling factors to compensate for attenuation. Of course, more than two sentinel samples in a storage array may be used if needed and preferably the sentinel samples in the input vectors have different values.

As mentioned above, both attenuation and offset may occur in a storage array; in order to detect both, in a fourth embodiment two or more sentinel samples (having different values) are used in an input vector (or in two different input vectors) resulting in two different sentinel tracks stored within the storage array. Upon decoding, the two resulting sentinel sample values are compared to the corresponding expected sentinel sample values in order to determine if attenuation, offset or both have occurred.

Using the following example, assume that two sentinel sample values of 1.0 and 2.0 are set in an input vector (or vectors), are encoded, stored within a storage array, and then retrieved and decoded. If the two resulting sample values are respectively 0.9 and 1.8, then as each sample has decreased by the same percentage (e.g., 10%), attenuation of 10% has occurred and such attenuation may be compensated for by scaling each of the resulting decoded samples in the output vector by 10/9.

On the other hand, if the two resulting sample values are respectively 0.7 and 1.7, i.e., each sentinel sample has been reduced by 0.3, then a negative offset of 0.3 has occurred and 0.3 may be added to each of the resulting decoded samples in the output vector in order to compensate for the offset. A simple mathematical calculation may be used to determine that each of the two sentinel samples has not decreased by the same percentage but have decreased by the same fixed value.

Alternatively, it is possible that both attenuation and offset have occurred. Referring to FIG. 13, if attenuation of a sentinel sample is 75%, and offset is −0.3, then a sentinel sample input with a value of 1.0 being encoded and input into the storage array will have a value of 0.45 upon retrieval from the array and decoding. Similarly the sentinel sample starting with a value of 2.0 will have a value of 1.2 after retrieval from the same storage array and decoding. Comparing 0.45 to 1.0, and comparing 1.2 to 2.0, it is clear that both resulting sentinel sample values have not decreased by the same percentage (i.e., which would indicate that only attenuation is present), and that both resulting sentinel sample values have not decreased by the same fixed amount (i.e., which would indicate that only offset is present). Thus, both attenuation and offset are present. Simple mathematical calculations may be used to determine that both are present (and not one or the other).

Knowing that both are present, straightforward linear equations with the two unknown variables may be used to solve for both the attenuation percentage and the offset. In this case, using "A" to represent the attenuation percentage (e.g., "0.20" represents a 20% attenuation) and "O" to represent a positive offset value, the equations for this specific example are: $1.0 \times (1-A) - O = 0.45$, and $2.0 \times (1-A) - O = 1.2$. Once the attenuation and offset are both known, the resultant samples in the output vector (or vectors) may be adjusted by compensating for attenuation and offset as has been described above.

In general, the relationship of the recovered sample value (Y) to the input sentinel sample value (X) can be expressed in the simple first order equation of $Y=mX+b$ (commonly m is the slope and b is the Y intercept), but here m is the attenuation and b is the offset. One may use the example of $Y=mX+b$, but if the equation is written as $Y=m'(X+b')$, through simple arithmetic one can map the m to m' and the b to b' in the different forms of the equation. The first form of the equation may be used if it is suspected that an offset changes the already-attenuated cell values in the sentinel track of the storage array, and the second form if it is suspected that attenuation changes the combination of the cell values and the offset.

In fact, if it is not known whether an attenuation or offset is present, either of the above pairs of formulas may be employed, solved for, and the variable representing attenuation or offset will be zero if that particular signal degradation is not present.

Of course, there may be many hundreds, thousands or more input vectors that are encoded and stored in the storage array. Any attenuation or offset detected as above in a sentinel track or track may be used as a proxy for all storage cells of the array, and each resultant sample in an output vector that has been read from the storage array may be adjusted to compensate for attenuation or offset or both. The samples stored in a storage array may represent an image, photograph, video, or other collection of data as is herein described.

Transmitter Embodiment

FIG. 6 is a block diagram of SSVT transmitter 28. As discussed herein, the output of the encoders 42 may be into a storage subsystem 100a, 100b, or may be onto transmission medium 34. The distributor 440 includes an assembly bank 450, a staging bank 452, a presentation bank 454 and a controller 456. An encoder block 460 includes a bank of digital-to-analog converters (DACs) 462 and four encoders 42 (or more), one for each EM pathway on a transmission medium. As mentioned herein, a stream of samples from a single source (such as a camera, image sensor, another sensor, etc.) arrives at transmitter 28 for encoding. Each encoder 42 encodes one input vector of N samples and produces L output levels. Transmitter 28 may be located separated from the video source or may be located within the video source.

The distributor 440 is arranged to receive the exposed color information (e.g., RGB) for the stream of sets of samples, one after the other. In response, the assembly bank 450 builds the four vectors $V_0$, $V_1$, $V_2$ and $V_3$ from the exposed color information (e.g., RGB) for the incoming stream of sets of samples. As the sets of samples are received, they are stored in the assembly bank 450 according to the predetermined permutation. The distributor 440 may use any number of different permutations when building the vectors containing N samples each.

The staging bank 452 facilitates the crossing of the N samples of each of the four vectors $V_0$, $V_1$, $V_2$ and $V_3$ from a first clock frequency (or first timing domain) used by a retimer into a second clock frequency (or second domain) used for the encoding and output of the resulting analog output levels. Using the example with N=60 and S=3, the samples representing exactly 80 sets of RGB samples are contained in the four encoder input vectors $V_0$, $V_1$, $V_2$ and $V_3$.

In various embodiments, the first clock frequency can be faster, slower or the same as the second clock frequency. The first clock frequency f_pix is determined by the video format selected by a video source. The second clock frequency f_ssvt is a function of f_pix, the number P of EM pathways in the transmission medium, the number S of samples in each set of input/output samples, and the SSVT transform parameters N (the number of input/output vector locations) and L (the length of each SDDS code), where f_ssvt= (f_pix*S*L)/(P*N). With this arrangement, the input clock (pix_clk) oscillates at one rate, and the SSVT clock (ssvt_clk) oscillates at another rate. These rates can be the same or different. The encoder performs the encoding while the next input vector is prepared. The presentation bank 454 presents the N samples of each of the four encoder input vectors $V_0$, $V_1$, $V_2$ and $V_3$ to the encoder block 460 (e.g., vector $V_0$ includes $Sample_{0,0}$ through $Sample_{0,N-1}$).

Controller 456 controls the operation and timing of assembly bank 450, the staging bank 452, and the presentation bank 454. In particular, the controller is responsible for defining the permutation used and the number of samples N when building the four encoder input vectors $V_0$, $V_1$, $V_2$ and $V_3$. The controller 456 is also responsible for coordinating the clock domain crossing from the first clock frequency to the second clock frequency as performed by the staging bank 452. The controller 456 is further responsible for coordinating the timing of when the presentation bank 454 presents the N samples of each of the encoder input vectors $V_0$, $V_1$, $V_2$ and $V_3$ to the encoder block 460.

Within the encoder block 460, a plurality of digital-to-analog converters (DACs) 462 is provided, each arranged to receive one of the P*N samples ($Sample_{0,0}$ through $Sample_{P-1,N-1}$) assigned to the four encoder input vectors $V_0$, $V_1$, $V_2$ and $V_3$ collectively. Each DAC 462 converts its received sample from the digital domain into a differential pair of voltage signals having a magnitude that is proportional to its incoming digital value. The output of the DACs 462 may range from a maximum voltage to a minimum voltage.

The four encoders 42 are provided for the four encoder input vectors $V_0$, $V_1$, $V_2$ and $V_3$ respectively. Each encoder 42 receives the differential pair of signals for each of the N samples for its encoder input vector, modulates each of the N differential pair of voltage signals using chips from a code corresponding to each sample, accumulates the modulated values and then generates a differential EM level output level. Since there are four encoders 42 in this example, there are $Levels_0$ through $Levels_3$ that are simultaneously output.

A sequencer circuit 465 coordinates the timing of the operation of the DACs 462 and the encoders 42. The sequencer circuit 465 is responsible for controlling the clocking of the DACs 462 and the encoders 42. The sequencer circuit 465 is also responsible for generating two clock phase signals, "clk 1" and "clk 2", that are responsible for controlling the operation of the encoders 42.

Receiver Embodiment—Digital Output

Figure 7:
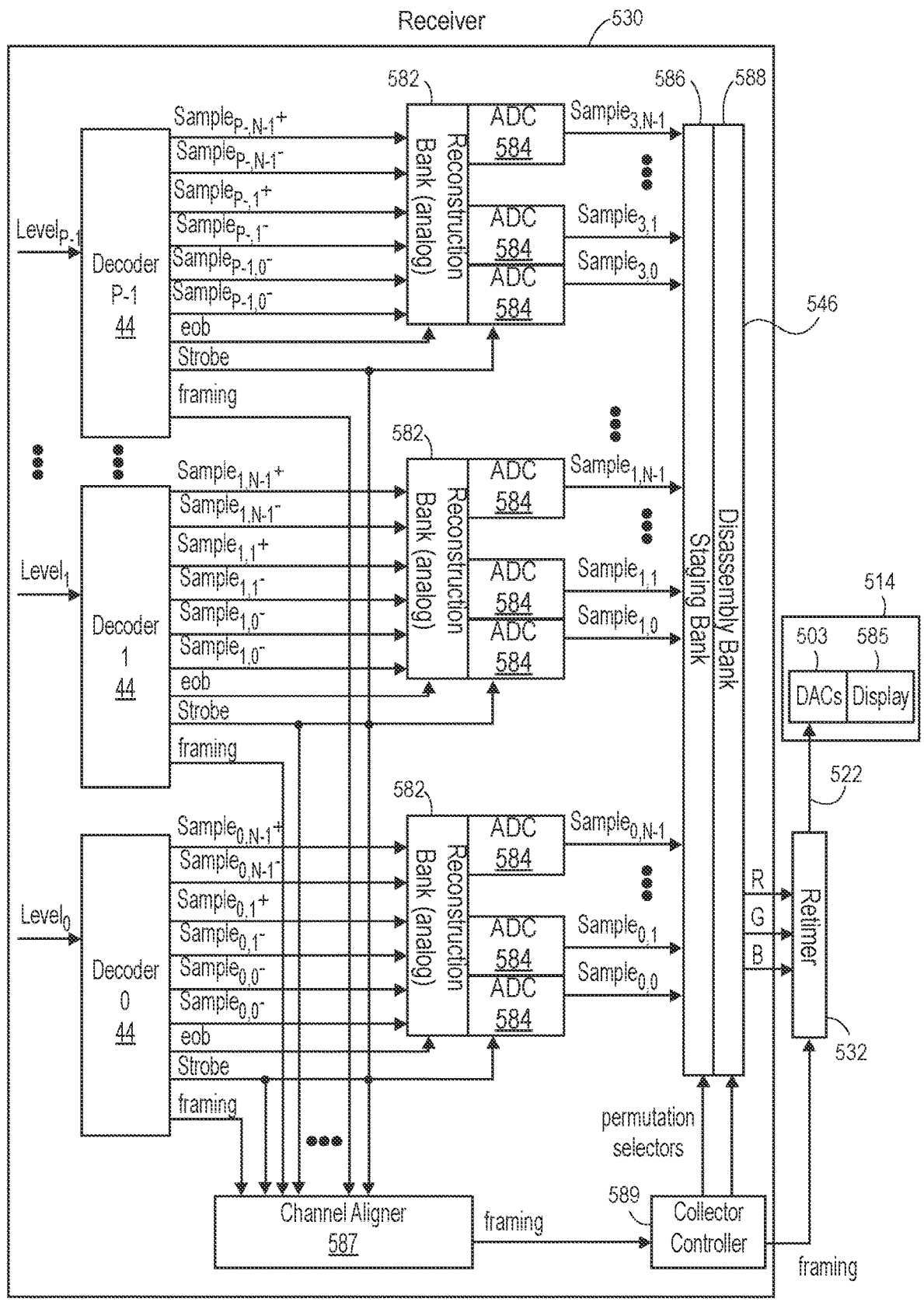
FIG. 7 is a block diagram of an SSVT receiver.

FIG. 7 is a block diagram of an SSVT receiver 30. As discussed herein, the input into the decoders 44 may be from a storage subsystem 100a, 100d or may be from transmission medium 34.

On the receive side, receiver 30 is responsible for decoding the stream of four EM level output signals received over the transmission medium 34 back into a format suitable for display or other. For example, the video content (e.g., signals S) contained in the samples 22 can be presented on a video display, frame after frame. As a result, the video capture by the video source 12 can be re-created by the video sink 14.

The receiver 30 performs the inverse of the encoding performed by the transmitter 28 on the transmit side. The receiver 30 uses four decoders 44 and a collector 546. The decoders 44 reconstruct the four EM level output signals into four decoder output vectors. The collector 546 then assigns the samples of the decoder output vectors to the original stream of sets of samples 22, which each include S reconstructed samples corresponding to the original S samples at that location in the stream.

The P decoders 44 (labeled 0 through P-1) are arranged to receive differential EM level signals $Levels_0$ through $Levels_{P-1}$ respectively. In response, each of the decoders 44 generates N differential pairs of reconstructed samples ($Sample_0$ through $Sample_{N-1}$). In the case where there are four decoders 80 (P=4), four output vectors $V_0$, $V_1$, $V_2$ and $V_3$ are constructed respectively.

Reconstruction banks 582 sample and hold each of the differential pairs of N reconstructed samples ($Sample_0$ through $Sample_{N-1}$) for each of the four decoder output vectors $V_0$, $V_1$, $V_2$ and $V_3$ at the end of each decoding interval respectively. An analog-to-digital converter (ADC) 584 is provided for each of the N samples ($Sample_0$ through $Sample_{N-1}$ for each of the four vectors $V_0$, $V_1$, $V_2$ and $V_3$ respectively. Each ADC converts its received differential pair of voltage signals into a corresponding digital value, resulting in digital samples ($Sample_{N-1}$ through $Sample_0$) for each of the four vectors $V_0$, $V_1$, $V_2$ and $V_3$ respectively. The ADCs operate at a clock rate=f_ssvt/L.

The collector 546 includes a staging bank 586 and a disassembly bank 588. The staging bank 586 receives all the reconstructed samples ($N_{n-1}$ through $N_0$) for each of the four decoder output vectors $V_0$, $V_1$, $V_2$ and $V_3$. The disassembly bank 588 (a) disassembles the samples (Sample$_{N-1}$ through Sample$_0$) for each of the four decoder output vectors $V_0$, $V_1$, $V_2$ and $V_3$ back into the exposed color information (e.g., the S signals) for the stream of sets of samples 22 (e.g., in this example, "S=3 for RGB pixels") using the same permutation scheme as used on the transmit side and (b) crosses the reconstructed samples from the second clock domain back to the first clock domain. The stream of sets of reconstructed samples 22 is then provided to the retimer 32, which reformats the video signal. The output of the retimer 32 is therefore a recreation of the sequence of time-ordered sets of samples 22. The video sink 14 includes a bank of DACs 503 and a video display 585. The bank of DACs 503 is responsible for converting the samples 22 in the digital domain back into the analog domain. In one embodiment, a DAC 503 is provided for each row in the display 585. Once the samples 22 are converted into the analog domain, they are displayed on the video display 585 in a well-known manner.

Receiver 30 also includes a channel aligner 587 and a collector controller 589, which receives framing information and aperture information from each decoder 44. In response, the collector controller 589 coordinates the timing of the staging bank 586 and/or the disassembly bank 588 to ensure that all the samples presented to the disassembly bank come from a common time interval in which the level signals were sent by the transmitter 28. As a result, (a) the disassembly by the bank 88 may be delayed until all samples are received and (b) the individual channels of the transmission medium 34 do not necessarily have to all be the same length since the disassembly bank 588 compensates for any timing differences.

In the above-described embodiment, the ADCs 584 convert the decoded samples into the digital domain and the DACs 503 in the video sink 14 convert the ordered sets of samples 22 back into the analog domain just prior to display. Depending upon the implementation and the nature of the samples (e.g., color video samples, black-and-white samples, sound sample values, etc.), it may not be necessary to use the ADCs to convert the samples back into digital, nor to use the staging or disassembly banks, etc. For example, once the samples have been decoded and have been output from each decoder (i.e., each decoder outputting an output vector from 1 to N sample values) these samples may be used as is according to the implementation.

Receiver Embodiment—Analog Output

In an alternative embodiment the sample outputs from the reconstruction banks 82 may remain in the analog domain, thus eliminating the need for the ADCs 584 and other components. In this embodiment, the ADCs 584, disassembly bank 588, retimer 32, and DACs 503 are eliminated. Instead, the analog sample outputs are provided to the staging bank 586, which performs the same permutation on the samples used when the vectors $V_0$ through $V_3$ were constructed on the transmit side. The sample outputs of the staging bank 586 are then used to directly drive a display 585 of the video sink through an optional level shifter. Since different types of displays require different voltages used to drive their display panels, a level shifter may be used to scale the scale the voltages of the video sample outputs of the staging bank as needed. Any suitable level shifters may be used, as known in the art, such as latch type or inverter type. Therefore, staging bank 586 outputs its output vectors of analog samples directly to a level shifter and then to the source drivers of the display.

With this embodiment, the collector controller 589 performs several functions. The collector controller 589 is responsible for keeping track and providing to the staging bank 586 the proper permutation selection to use. The collector controller 589 may also provide gain and gamma values to the display. Gain determines how much amplification is applied and the gamma curve relates the luminous flux to the perceived brightness, which linearizes human's optical perception of the luminous flux. The framing signal signifies the timing for constructing video frames on the display. The inversion signal may optionally be used to control the level shifter to invert or not invert the video sample outputs, as may be required by some types of display panels such as OLEDs. If a level shifter is used, the output of the level shifter is typically latched. In such embodiments, a latch signal may be used to control the timing of the latching and release of any level shifted the video sample output signals. Finally, the gate driver control signal is used to the gate driver circuitry typically used to drive the horizontal rows of many displays.

Storage Subsystem Functional Requirements

Depending upon the particular implementation, use of the above storage array may involve adherence to particular external standards and protocols. External requirements for networked data access to memory may include adherence to protocols such as: Block/SAN (NVMe, fibre channel), file (NFS, Microsoft SMB) and object ($S_3$). Data organization may require adherence to standards regarding: volumes, file systems, and quotas. Security may require adherence to standards regarding: authentication, authorization and encryption for data at rest. Finally, there may be external requirements for management of data in a storage array.

Further, depending upon the particular implementation, use of the above storage array may involve adherence to particular internal standards and protocols. For example, if implementing a flash array, DRAM caching may be used for repeated reads and for staging writes. Write caching may be important for flash storage as well (as writes take well longer than reads on flash). Preferably, DRAM caching typically needs to be redundant and non-volatile (NVRAM) so writes can be acknowledged quickly and there is no data loss in the face of failures (typically DRAM plus capacitor that copies content to flash in the event of a power failure).

Ssvt Signal, Encoding and Decoding

As mentioned above, various embodiments of the present invention disclose storage of analog or digital samples using an SSVT encoding and decoding technique in which the samples are stored as analog values. The present disclosure discloses a novel discrete-time, continuous-amplitude EM signal termed a "spread-spectrum video transport" (SSVT) signal that is an improvement over existing SSDS-CDMA signals. SSVT refers to the transmission of electromagnetic signals over an EM pathway or pathways using an improved spread-spectrum direct sequence (SSDS)-based modulation.

Code Division Multiple Access (CDMA) is a well-known channel access protocol that is commonly used for radio communication technologies, including cellular telephony. CDMA is an example of multiple access, wherein several different transmitters can send information simultaneously over a single communication channel in telecommunications applications, CDMA allows multiple users to share a given frequency band without interference from other users. CDMA employs Spread Spectrum Direct Sequence (SSDS) encoding which relies on unique codes to encode each user's data. By using unique codes, the transmission of the multiple users can be combined and sent without interference between the users. On the receive side, the same unique codes are used for each user to demodulate the transmission, recovering the data of each user respectively.

An SSVT signal is different from CDMA. As a stream of input video (for example) samples is received at encoders, they are encoded by applying an SSDS-based modulation to each of multiple encoder input vectors to generate the SSVT signals. The SSVT signals are then transmitted over a transmission medium. On the receive side, the incoming SSVT signals are decoded by applying the corresponding SSDS-based demodulation in order to reconstruct the samples that were encoded. As a result, the original stream of time-ordered video samples containing color and pixel-related information is conveyed from a single video source to a single video sink, unlike CDMA which delivers data from multiple users to multiple receivers.

Figure 8:
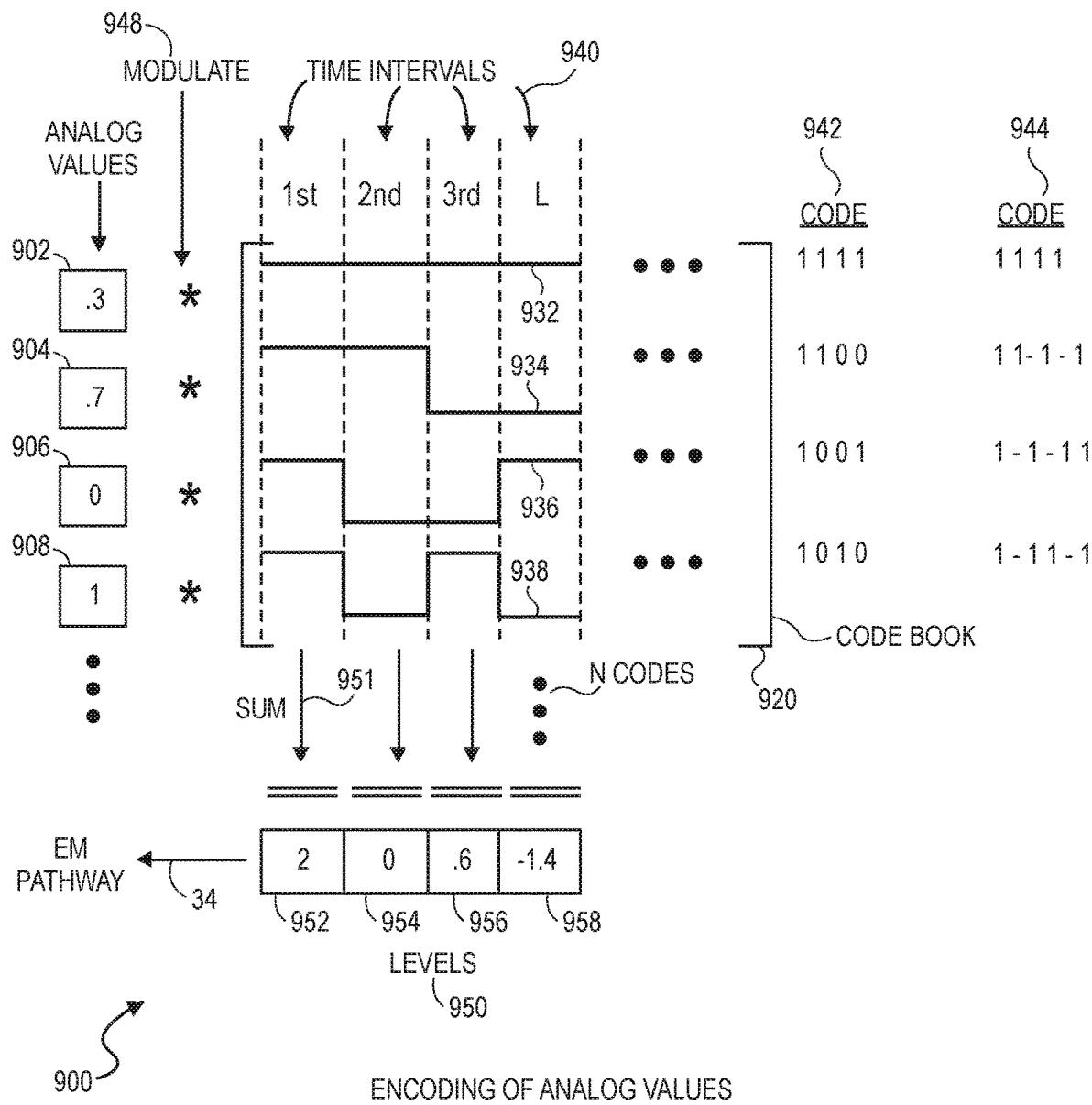
FIG. 8 illustrates a simplistic example showing how signal samples, in this case, analog values, are encoded within an encoder and then output.

FIG. 8 illustrates a simplistic example showing how signal samples, in this case, analog values, are encoded within an encoder and then output. Shown is an input vector of N analog values 902-908 which represent voltages of individual pixels within a video frame. These voltages may represent luminosity of a black-and-white image or luminosity of a particular color value in a pixel, e.g., an R, G or B color value of the pixel, i.e., each value represents a sensed or measured amount of light in the designated color space. Although pixel voltages are used in this example, this encoding technique may be used with voltages representing any of a variety of signals from a sensor such LIDAR values, sound values, haptic values, aerosol values, etc., and the analog values may represent other samples such as current, etc. Signal samples that are digital values may also be encoded and this digital encoding is explained below.

Preferably, the range of these voltages is from 0 to 1 V for efficiency, although a different range is possible. These voltages typically are taken from pixels in a row of a frame in a particular order, but another convention may be used to select and order those pixels. Whichever convention is used to select these pixels and to order them for encoding, that same convention will be used at the receiving end by the decoder in order to decode these voltages in the same order and then to place them in the resulting frame where they belong. By the same token, if the frame is in color and uses RGB, the convention in this encoder may be that all of the R pixel voltages are encoded first, and then the G and B voltages, or the convention may be that voltages 902-906 are the RGB values of a pixel in that row and that the next three voltages 908-912 represent the RGB values of the next pixel, etc. Again, the same convention used by this encoder to order and encode voltages will be used by the decoder. Any particular convention for ordering analog values 902-908 (whether by color value, by row, etc.) may be used as long as the decoder uses the same convention. As shown, any number of N analog values 902-908 may be presented for encoding at a time using code book 920, limited only by the number of entries in the code book.

As mentioned, code book 920 has any number of N codes 932-938; in this simple example, the code book has four codes meaning that four analog values 902-908 are encoded at a time. A greater number of codes such as 127 codes, 255 codes, etc., may be used, but due to practical considerations such as circuit complexity, fewer codes are preferably used. As known in the art, code book 920 includes N mutually-orthogonal codes each of length L; in this example L=4. Typically, each code is an SSDS code, but need not necessarily be a spreading code. As shown, each code is divided into L time intervals (also called "chips") and each time interval includes a binary value for that code. As shown at code representation 942, code 934 may be represented in the traditional binary form "1100", although that same code may also be represented as "11-1-1" as shown in code representation 944 for ease-of-use in modulating the value as will be explained below. Codes 932 and 936-938 may also be represented as in 942 or in 944. Note that each code of length L is not associated with a different computing device (such as a telephone), a different person or a different transmitter, as is done in CDMA.

Therefore, in order to output the four analog values 902-908 the following technique is used. Each analog value will be modulated by each chip in the representation 944 of its corresponding code; e.g., value 902, namely 0.3, is modulated 948 by each chip in the representation 944 of code 932 sequentially in time. Modulation 948 may be the multiplication operator. Thus, modulating 0.3 by code 932 results in the series "0.3, 0.3, 0.3, 0.3". Modulating 0.7 by code 934 becomes "0.7, 0.7, −0.7, −0.7"; value "0" becomes "0, 0, 0, 0"; and "value 1" becomes "1,−1, 1,−1". Typically, the first chip of each code modulates its corresponding analog value, and then the next chip of each code modulates its analog value, although an implementation may also modulate a particular analog value by all the chips of its code before moving on to the next analog value.

Each time interval, the modulated analog values are then summed at 951 (perceived vertically in this drawing) to obtain analog output levels 952-958; e.g., the summation of modulated values for these time intervals results in output levels of 2, 0, 0.6, −1.4. These analog output levels 952-958 may be further normalized or amplified to align with a transmission line's voltage restrictions), and may then be sent sequentially in time as they are produced over an electromagnetic pathway (such as a differential twisted-pair) of transmission medium 34 in that order, or may be output in parallel into a storage array. A receiver then receives those output levels 952-958 in that order and then decodes them using the same code book 920 using the reverse of the encoding scheme shown here. The resultant pixel voltages 902-908 may then be displayed in a frame of a display at the receiving end in accordance with the convention used. Thus, analog values 902-908 are effectively encoded synchronously and output as L analog output levels 952-958 to pathway 34 or into storage.

Advantageously, even though the use of robust SSDS techniques (such as spreading codes) results in a significant drop in bandwidth, the use of mutually-orthogonal codes, the modulation of each sample by chips of its corresponding code, summation, and the encoding of N samples in parallel using L output levels results in a significant bandwidth gain. In contrast with traditional CDMA techniques in which binary digits are encoded serially and then summed, the present invention first modulates the entire sample (i.e., the entire analog or digital value, not a single bit) by each chip in a corresponding code, and then sums those modulations at each time interval of the codes to obtain a resultant analog voltage level for each particular time interval, thus exploiting the amplitude of the resultant waveform. Further, the present invention facilitates sending analog voltages from one video source to another video sink, i.e., from endpoint to endpoint, unlike CDMA techniques which allow for multiple access by different people, different devices or different sources, and send to multiple sinks. Moreover, compression is not required for the transport or storage of the sample values.

Figure 9:
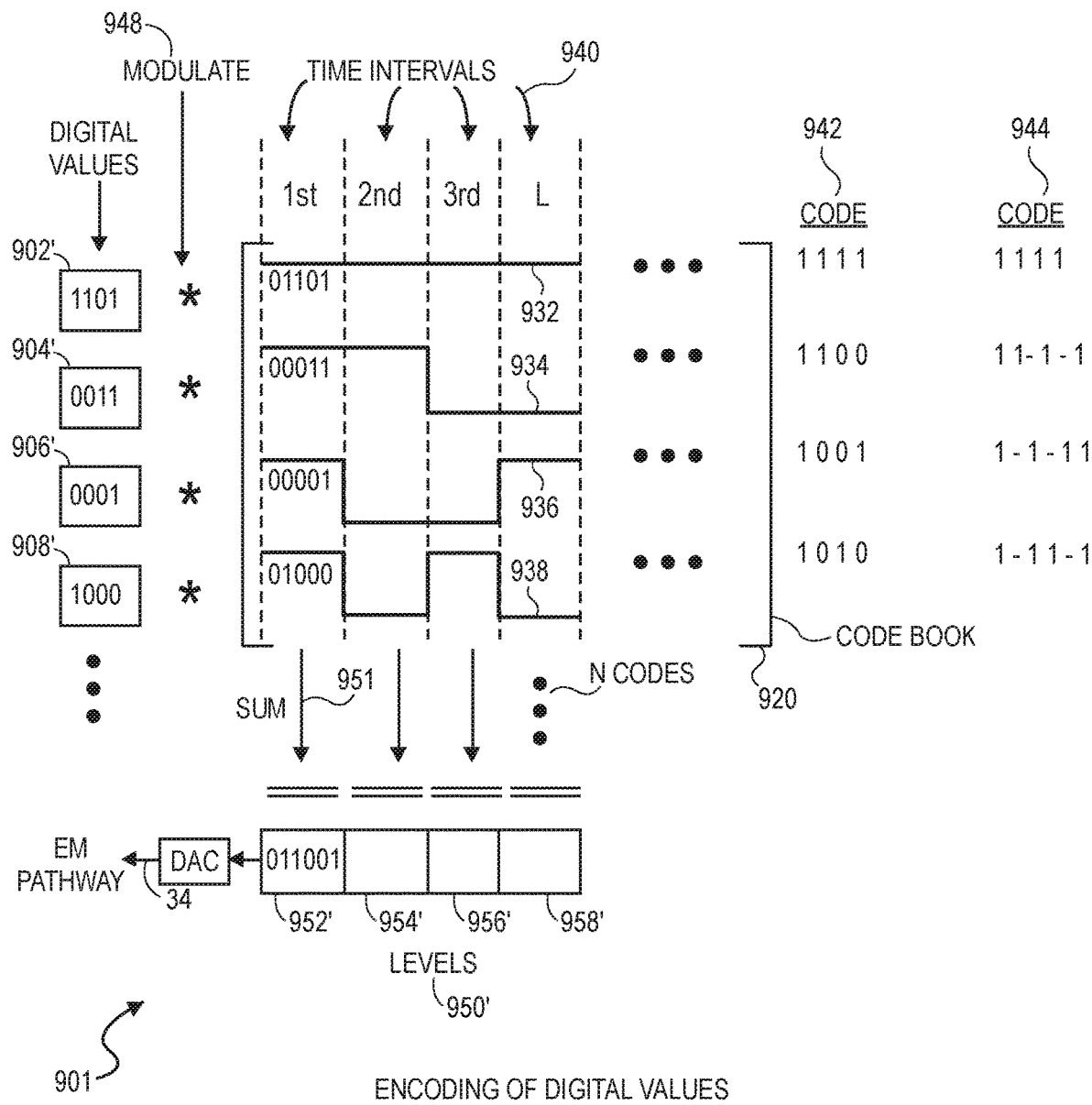
FIG. 9 illustrates this novel encoding technique as being applicable to signal samples that are digital values.

FIG. 9 illustrates this novel encoding technique as being applicable to signal samples that are digital values. Here, digital values 902'-908' are digital representations of voltages. Using a different example of voltages, value 902' is "1101" value 904' is "0011," value 906' is "0001," and value 908' is "1000." Each digital value is modulated (digitally multiplied) by the representation 944 of each code, that is by "1" or by "−1" depending upon the chip of the code corresponding to the digital value to be modulated. Considering only the first time interval 940 of each code, and adding a most significant bit (MSB) which is the sign bit, modulating "1101" yields "01101" (the MSB "0" meaning a positive value), modulating "0011" yields "00011", modulating "0001" yields "00001," and modulating "1000" yields "01000." These modulated values are shown annotated on the first time interval. (Although not shown, modulating by a −1 chip yields a negative value which may be expressed in binary using a suitable binary representation for negative values.)

Summing digitally, these modulated values in the first time interval yields digital value 952' "011001" (again, the MSB is the sign bit); the other digital values 954'-958' are not shown in this example, but are calculated in the same way. Considering this summation in base 10, one can verify that the modulated values 13, 3, 1 and 8 do sum to 25. Although not shown in this example, typically additional MSBs will be available for the resultant levels 952'-958' in that the sum may require more than five bits. For example, if values 902'-908' are represented using four bits, then levels 952'-958' may be represented using up to ten bits, in the case where there are 64 codes (adding log 2 of 64 bits). Or, if 32 modulated values are summed then five more bits will be added. The number of bits needed for the output levels will depend upon the number of codes.

The output levels 950' may be first normalized to adjust to the DAC's input requirements and then fed sequentially into a DAC 959 for conversion of each digital value into its corresponding analog value for transmission over the EM pathway or, each level has its own DAC and is then input into storage. DAC 959 may be a MAX5857RFDAC (includes a clock multiplying PLL/VCO and a 14-bit RF DAC core, and the complex path may be bypassed to access the RF DAC core directly), and may be followed by a bandpass filter and then a variable gain amplifier (VGA), not shown. In some situations the number of bits used in levels 950' are greater than the number allowed by DAC 959, e.g., level 952' is represented by ten bits but DAC 959 is an 8-bit DAC. In these situations, the appropriate number of LSBs are discarded and the remaining MSBs are processed by the DAC, with no loss in the visual quality of the resultant image at the display.

Advantageously, entire digital values are modulated, and then these entire modulated digital values are summed digitally to produce a digital output level for conversion and transmission or input into storage. This technique is different from CDMA which modulates each binary digit of a digital value and then sums these modulated bits to produce outputs. For example, assuming that there are B bits in each digital value, with CDMA, there will be a total of B*L output levels to send, whereas with this novel digital (or analog) encoding technique there will only be a total of L output levels, thus having an advantage.

Figure 10:
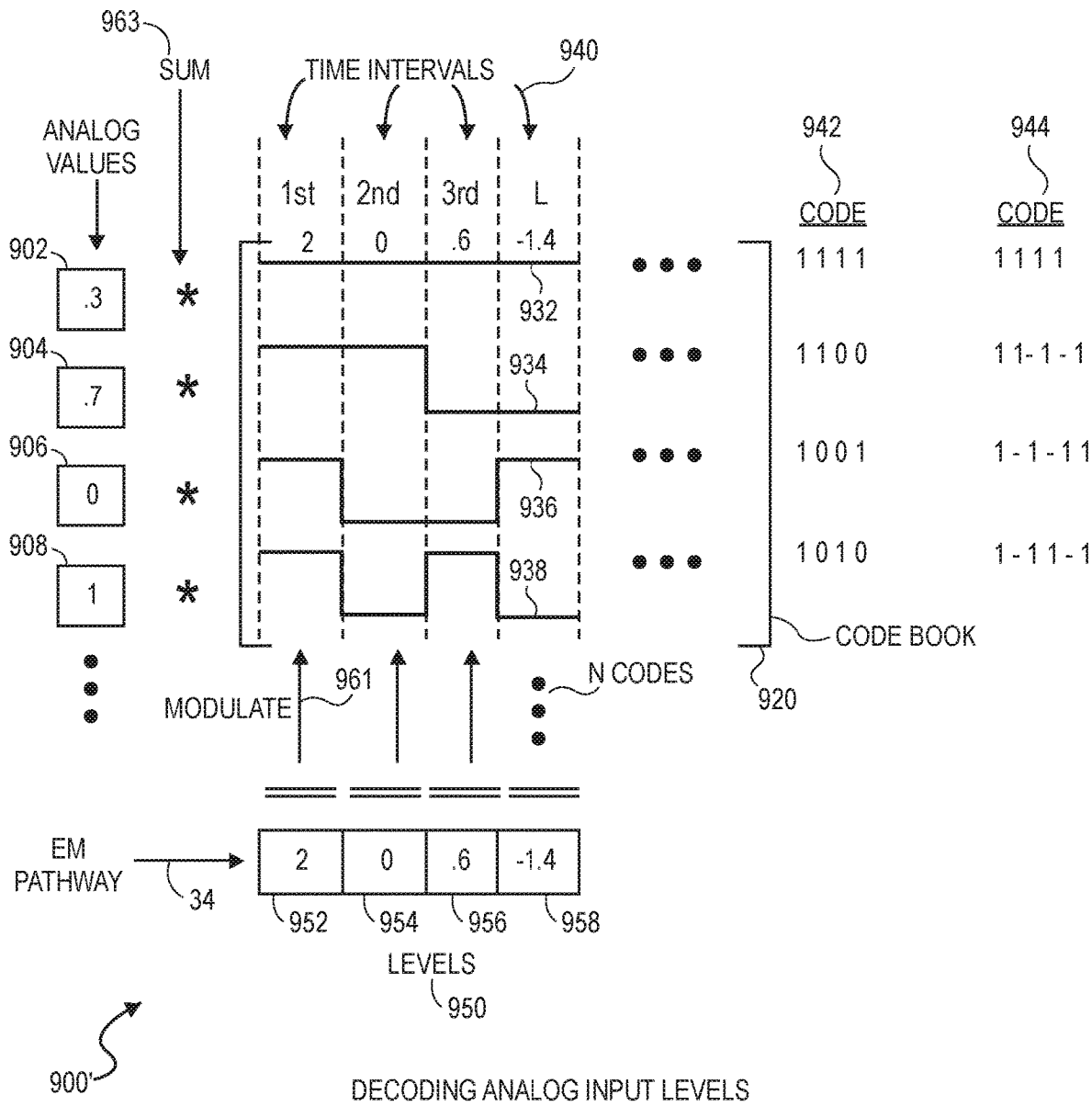
FIG. 10 illustrates the decoding of analog input levels that were encoded using the encoder of FIG. 8.

FIG. 10 illustrates the decoding of analog input levels that were encoded using the encoder of FIG. 8. As shown, L input levels 950 have been received over a single electromagnetic pathway of a transmission medium 34 or from storage. As described herein and noted earlier, code book 920 includes N orthogonal codes 932-938 that will be used to decode input levels 950 to produce an output vector of N analog values 902-908, i.e., the same analog values 902-908 that were encoded above. To perform decoding, as indicated by the vertical arrows, each input level 952-958 is modulated 961 by each chip of each code corresponding to a particular index in the output vector 902-908. Considering modulation of levels 952-958 by the first code 932, such modulation produces the series of modulated values "2, 0, 0.6,−1.4". Modulation of levels 952-958 by the second code 934 produces the series of modulated values "2, 0, −0.6, 1.4". Modulation by the third code 936 produces "2, 0, −0.6,−1.4", and modulation by the fourth code 938 produces "2, 0, 0.6, 1.4".

Next, as indicated by the horizontal arrows, each series of modulated values is summed in order to produce one of the analog values 902-908. For example, the first series is summed to produce the analog value "1.2" (which becomes "0.3" after being normalized using the scale factor of "4). In a similar fashion, the other three series of modulated values are summed to produce the analog values "2.8", "0" and "4", and after being normalized yield the output vector of analog values 902-908. Each code may modulate the input levels and then that series may be summed, or, all may modulate the input levels before each series is summed Thus, the output vector of N analog values 902-908 has been stored or transported in parallel using L output levels.

Not shown in these examples is an example of decoding digital input levels, although one of skill in the art will find it straightforward to perform such decoding upon reading the encoding of digital values in the above description.

FIGS. 11A, 11B and 11C illustrate that the encoders and decoders may operate upon either analog samples or digital samples; the various analog and digital encoders and decoders have previously been described above. As explained above, there may be more than one EM pathway and accordingly more than one encoder/decoder pair and a corresponding number of DACs or ADCs as the case may be. And, as explained herein, pathway 34 in these figures may instead be the storage array 120.

FIG. 11A illustrates use of an analog encoder and a corresponding analog decoder. Input into analog encoder 900 are either analog samples 970 or digital samples 971 that have been converted into analog by a DAC 972 located at the analog encoder. In this fashion, either analog or digital samples that arrive at the analog encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 11B illustrates use of a digital encoder and a corresponding analog decoder. Input into digital encoder 901 are either digital samples 971 or analog samples 970 that have been converted into digital by an ADC 973 located at the digital encoder. As the encoder is digital, a DAC 959 located at the encoder converts the encoded samples into analog before transmission over the electromagnetic pathway. In this fashion, either analog or digital samples that arrive at the digital encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 11C illustrates use of a digital decoder to decode encoded analog signals that have arrived over an electromagnetic pathway on transmission medium 34. The encoded analog signals may been transmitted using either the analog encoder or the digital encoder described immediately above. An ADC 974 located at digital decoder 976 receives the encoded analog samples sent via the electromagnetic pathway and converts the samples into digital. These encoded digital samples are then decoded by digital decoder 976 into digital samples 978 (corresponding to the values of an input vector of samples that was originally encoded before transmission over the electromagnetic pathway). Digital samples 978 may be used as is or may be converted into analog samples using a DAC.

Figure 12:
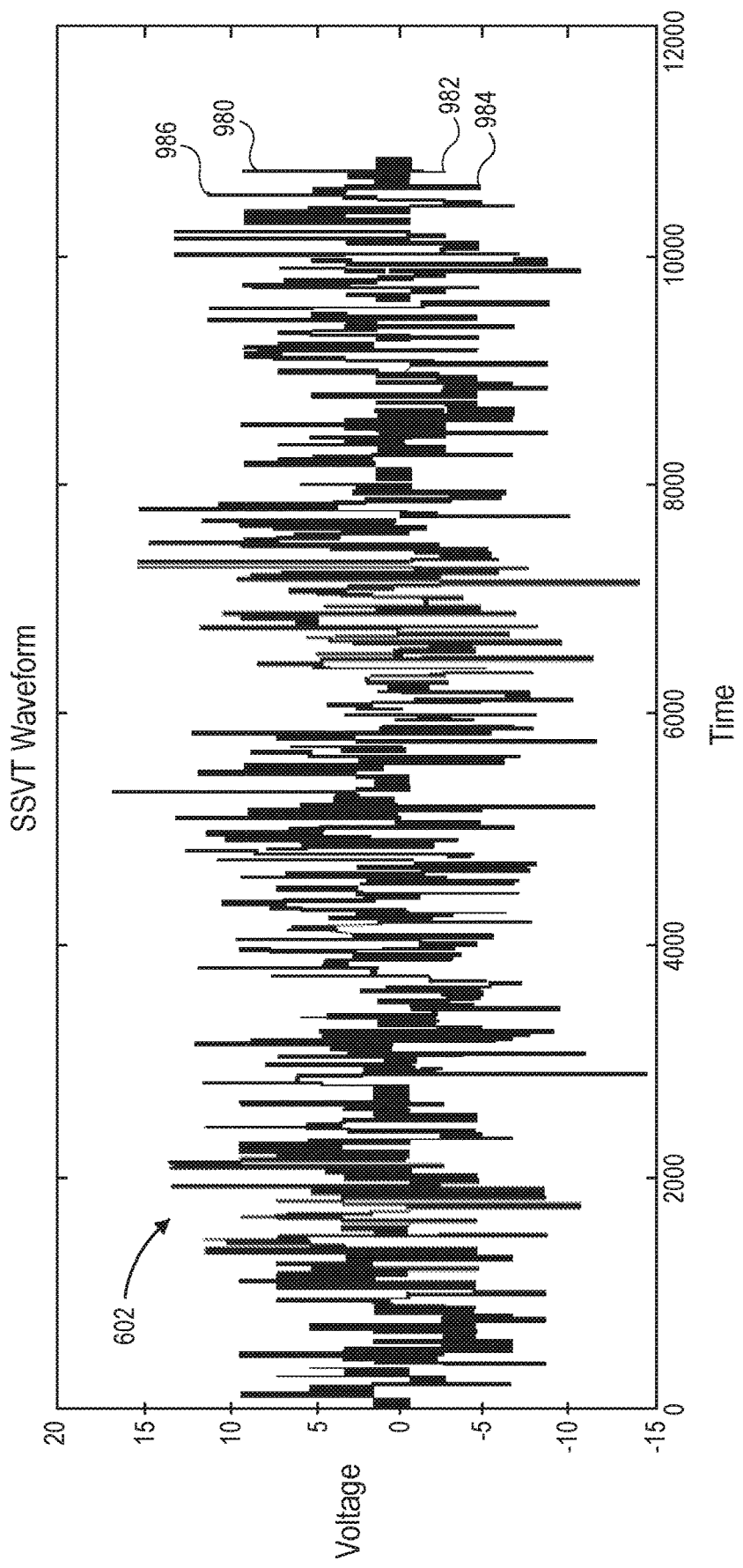
FIG. 12 shows a simulation of an SSVT waveform sent via an electromagnetic pathway.

FIG. 12 shows a simulation (similar to an idealized oscilloscope trace) of an SSVT waveform 602 sent via an electromagnetic pathway after being output from an analog encoder (or after being digitally encoded and then converted by a DAC). The vertical scale is voltage, and the horizontal scale is a 100 ps oscilloscope measurement time interval. Note that SSVT signal 602 is an analog waveform rather than a digital signal (i.e., the signal does not represent binary digits) and in this embodiment can transport a range of voltages from about −15 V up to about +15 V. The voltage values of the analog waveform are (or at least can be) fully analog. Also, voltages are not limited to some maximum value, although high values are impractical.

As previously explained, analog voltage levels are sent sequentially over an electromagnetic pathway or stored in parallel, each level being the summation of modulated samples per time interval, such as the analog output levels 952-958 above or the digital output levels 952'-958' above (after being passed through a DAC). When sent, these output levels then appear as a waveform such as waveform 602. In particular, voltage level 980 represents the summation in a particular time interval of modulated samples (i.e., an output level). Using a simplistic example, sequential voltage levels 980-986 represent the transmission of four output levels. In this example, 32 codes are used, meaning that 32 samples may be transmitted in parallel; thus, voltage levels 980-986 (followed by a number of subsequent voltage levels, depending upon the number of chips in a code, L) form the transmission in parallel of 32 encoded samples (such as pixel voltages from a video source). Subsequent to that transmission, the next set of L voltage levels of waveform 602 represent the transmission of the next 32 samples. In general, waveform 602 represents the encoding of analog or digital values into analog output levels, and the transmission of those levels in discrete time intervals to form a composite analog waveform.

Due to such phenomena as attenuation, reflections due to impedance mismatches, and impinging aggressor signals, every electromagnetic pathway degrades electromagnetic signals that propagate through it, and thus measurements taken of input levels at a receiving terminal are always subject to error with respect to corresponding output levels made available at the transmitting terminal. Hence, scaling of input levels at a receiver (or normalization or amplification of output levels at a transmitter) may be performed to compensate, as is known in the art. Further, due to process gain (i.e., due to an increase in L which also increases electrical resilience) decoded input levels at a decoder are normalized by a scale factor using the code length to recover the transmitted output levels as is known in the art.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. An apparatus for storing analog levels, said apparatus comprising:
    an encoder arranged to continuously input an input vector of N samples and to encode said N samples using N orthogonal spreading codes each of length L in order to output L analog levels in parallel, each of said codes used with one of said N samples and wherein $L>=N>=2$;
    a storage array that inputs said L analog levels, each on a data line of said storage array, and writes said L analog levels each into a storage cell of said storage array; and
    a decoder arranged to read said L analog levels in parallel from said storage array and to decode said L analog levels using said N orthogonal spreading codes in order to output an output vector of N samples, each of said codes used with one of said N samples and wherein said N samples of said output vector are substantially similar to said N samples of said input vector.

2. An apparatus as recited in claim 1 wherein said N samples are analog samples, wherein said encoding is analog encoding, and wherein said L analog levels are output directly from said encoder.

3. An apparatus as recited in claim 1 wherein said N samples are digital samples, wherein said encoding is digital encoding, said apparatus further comprising:
    at least one digital-to-analog converter arranged to receive L digital levels from said encoder and to produce said L analog levels for input into said storage array.

4. An apparatus as recited in claim 1 further comprising:
    a distributor arranged to continuously receive digital samples that originate at a video source and to distribute said digital samples into an input vector of N digital samples; and
    at least one digital-to-analog converter arranged to receive said N digital samples from said distributor and to produce N analog samples for input into said encoder.

5. An apparatus as recited in claim 1 wherein said storage array is non-volatile storage or volatile storage.

6. An apparatus as recited in claim 1 wherein said storage array continuously writes L analog output levels output from said encoder and writes at least a frame of video information into storage cells of said storage array.

7. An apparatus as recited in claim 1 wherein said N samples of said input vector originate at a single source and wherein said N samples of said output vector are destined for a single sink.

8. An apparatus as recited in claim 1 wherein said apparatus is within a video source, wherein said N samples are analog samples from a sensor of said video source, wherein said encoding is analog encoding, wherein said L analog levels are output directly from said encoder, and wherein said output vector of N samples is destined for a display of said video source.

9. An apparatus for storing analog signals comprising:
    a receiver arranged to continuously receive L analog levels of an analog signal from an electromagnetic pathway and to output said L analog levels in parallel, wherein said L analog levels represent N samples that have been encoded using N orthogonal spreading codes each of length L, each of said codes used with one of said N samples and wherein $L>=N>=2$;

a storage array that inputs said L analog levels, each on a data line of said storage array, and writes said L analog levels each into a storage cell of said storage array; and a transmitter arranged to read said L analog levels in parallel from said storage array and to output said L analog levels serially as an analog signal over an electromagnetic pathway.

10. An apparatus as recited in claim 9 wherein said storage array is non-volatile storage or volatile storage.

11. An apparatus as recited in claim 9 wherein said storage array continuously writes L analog levels output from said receiver and writes at least a frame of video information into storage cells of said storage array.

12. An apparatus as recited in claim 9 wherein said N samples originate at a single source and wherein said L analog levels output from said transmitter are destined for a single sink.

13. An apparatus as recited in claim 9, further comprising a write gate enable signal of said storage array that originates at said receiver and indicates when said L analog levels are available to be written.

14. An apparatus as recited in claim 9, further comprising a read gate enable signal of said storage array that originates at said transmitter and indicates when said transmitter is ready to read said L analog levels from said storage array.

15. An apparatus for storing analog levels, said apparatus comprising:

an encoder arranged to continuously input an input vector of N samples and to encode said N samples using N orthogonal spreading codes each of length L in order to output L analog levels in parallel, each of said codes used with one of said N samples and wherein $L>=N>=2$;

a storage array that inputs said L analog levels, each on a data line of said storage array, and writes said L analog levels each into a storage cell of said storage array; and a transmitter arranged to read said L analog levels in parallel from said storage array and to output said L analog levels serially as an analog signal over an electromagnetic pathway.

16. An apparatus as recited in claim 15 wherein said N samples are analog samples, wherein said encoding is analog encoding, and wherein said L analog levels are output directly from said encoder.

17. An apparatus as recited in claim 15 wherein said N samples are digital samples, wherein said encoding is digital encoding, said apparatus further comprising:

at least one digital-to-analog converter arranged to receive L digital levels from said encoder and to produce said L analog levels for input into said storage array.

18. An apparatus as recited in claim 15 further comprising:

a distributor arranged to continuously receive digital samples that originate at a video source and to distribute said digital samples into an input vector of N digital samples; and at least one digital-to-analog converter arranged to receive said N digital samples from said distributor and to produce N analog samples for input into said encoder.

19. An apparatus as recited in claim 15 wherein said storage array continuously writes L analog output levels output from said encoder and writes at least a frame of video information into storage cells of said storage array.

20. An apparatus as recited in claim 15 wherein said N samples of said input vector originate at a single source and wherein said L analog levels are destined for a single sink.

21. An apparatus for storing analog levels, said apparatus comprising:

a receiver arranged to continuously receive L analog levels of an analog signal from an electromagnetic pathway and to output said L analog levels in parallel, wherein said L analog levels represent N samples that have been encoded using N orthogonal spreading codes each of length L, each of said codes used with one of said N samples and wherein $L>=N>=2$;

a storage array that inputs said L analog levels, each on a data line of said storage array, and writes said L analog levels each into a storage cell of said storage array; and a decoder arranged to read said L analog levels in parallel from said storage array and to decode said L analog levels using said N orthogonal spreading codes in order to output an output vector of N samples, each of said codes used with one of said N samples and wherein said N samples of said output vector are substantially similar to said N samples of said input vector.

22. An apparatus as recited in claim 21, wherein said decoding is analog decoding, and wherein said L analog levels are input directly into said decoder.

23. An apparatus as recited in claim 21 wherein said N samples are digital samples, wherein said decoding is digital decoding, said apparatus further comprising:

at least one analog-to-digital converter arranged to receive said L analog levels from said storage array and to produce said N samples.

24. An apparatus as recited in claim 21 wherein said storage array continuously writes L analog output levels from said electromagnetic pathway and writes at least a frame of video information into storage cells of said storage array.

25. An apparatus as recited in claim 21 wherein said N samples originate at a single source and wherein said N samples of said output vector are destined for a single sink.

26. An apparatus for storing analog levels within a video source, said apparatus comprising:

a storage array arranged to input L analog levels, each on a data line of said storage array, and to write said L analog levels each into a storage cell of said storage array, wherein said L analog levels being the encoded form of an input vector of N analog samples having been encoded using N orthogonal spreading codes each of length L in order to output said L analog levels in parallel into said storage array, each of said codes being used with one of said N analog samples and wherein $L>=N>=2$, and wherein said N analog samples are analog samples from a sensor of said video source, said storage array being further arranged to output said L analog levels in parallel from said storage array to said video source.

27. An apparatus as recited in claim 26 wherein said storage array is non-volatile storage or volatile storage.

28. An apparatus as recited in claim 26 wherein said storage array continuously writes L analog levels output from said video source and writes at least a frame of video information into storage cells of said storage array.

29. An apparatus as recited in claim 26 wherein said L analog levels are destined for a display of said video source.

30. A system for transmitting analog levels, said apparatus comprising:

a video source arranged to convert incident light into a plurality of analog voltage samples representing an image;

an encoder of said video source arranged to continuously input an input vector of N of said analog voltage samples and to encode said N analog voltage samples using N orthogonal spreading codes each of length L in order to output L analog levels in parallel, each of said codes used with one of said N samples and wherein L>=N>=2, and to transmit from said video source said L analog levels over an electromagnetic pathway, wherein said video source does not convert said N analog voltage samples into digital form; and a receiver remote from said video source arranged to receive said L analog levels from said electromagnetic pathway and that includes a decoder arranged to decode said L analog levels using said N orthogonal spreading codes in order to output an output vector of N samples, each of said codes used with one of said N samples and wherein said N samples of said output vector are substantially similar to said N samples of said input vector.

31. A system as recited in claim 30, wherein said decoding is analog decoding, and wherein said L analog levels are input directly into said decoder from said receiver, said decoder outputting N analog samples.

32. A system as recited in claim 31, wherein said receiver further includes at least one analog-to-digital converter that converts said output vector of N samples into N digital samples.

33. A system as recited in claim 30 wherein said decoding is digital decoding, said receiver further comprising:
at least one analog-to-digital converter arranged to convert said received L analog levels into L digital levels before said digital decoding, said decoder producing N digital samples.

34. A method for compensating for attenuation of analog levels in storage, said method comprising:
inputting an input vector of N input samples from a video source, and setting one of said input samples to a known value;
encoding said N samples using N orthogonal spreading codes each of length L in order to output L analog levels in parallel, each of said codes used with one of said N samples and wherein L>=N>=2;
writing said L analog levels each into a storage cell of a storage array;
reading said L analog levels from said storage array and decoding said L analog levels using said N orthogonal spreading codes in order to output an output vector of N output samples, each of said codes used with one of said N output samples;
determining a ratio between said known value of said one of said input samples and a value of a corresponding one of said output samples; and
compensating for attenuation by replacing each of said N output samples with the product of said each output sample and said ratio.

35. A method as recited in claim 34 wherein a plurality of output vectors are output from said storage array, each after said reading and said decoding, said method further comprising:
compensating for attenuation by replacing each of said output samples in each of said plurality of output vectors with the product of said each output sample and said ratio.

36. A method as recited in claim 34 wherein said known value is a maximum or a minimum value permitted by said video source.

37. A method for compensating for offset of analog levels in storage, said method comprising:
inputting an input vector of N input samples from a video source, and setting one of said input samples to a known value;
encoding said N samples using N orthogonal spreading codes each of length L in order to output L analog levels in parallel, each of said codes used with one of said N samples and wherein L>=N>=2;
writing said L analog levels each into a storage cell of a storage array;
reading said L analog levels from said storage array and decoding said L analog levels using said N orthogonal spreading codes in order to output an output vector of N output samples, each of said codes used with one of said N output samples;
determining a difference between said known value of said one of said input samples and a value of a corresponding one of said output samples; and
compensating for offset by replacing each of said N output samples with the sum of said each output sample and said difference.

38. A method as recited in claim 37 wherein a plurality of output vectors are output from said storage array, each after said reading and said decoding, said method further comprising:
compensating for offset by replacing each of said output samples in each of said plurality of output vectors with the sum of said each output sample and said difference.

39. A method as recited in claim 37 wherein said known value is a maximum or a minimum value permitted by said video source.

40. A method for compensating for attenuation and offset of analog levels in storage, said method comprising:
inputting an input vector of N input samples from a video source, and setting a first and a second of said input samples to respective known values, wherein said known values are different;
encoding said N samples using N orthogonal spreading codes each of length L in order to output L analog levels in parallel, each of said codes used with one of said N samples and wherein L>=N>=2;
writing said L analog levels each into a storage cell of a storage array;
reading said L analog levels from said storage array and decoding said L analog levels using said N orthogonal spreading codes in order to output an output vector of N output samples, each of said codes used with one of said N output samples;
solving two linear equations to determine attenuation and offset of said N output samples, said first linear equation using said first known value and a value of an output sample corresponding to said first input sample, said second linear equation using said second known value and a value of an output sample corresponding to said second input sample; and
compensating for attenuation and offset in each of said N output samples using said determined attenuation and offset.

41. A method as recited in claim 40 wherein a plurality of output vectors are output from said storage array, each after said reading and said decoding, said method further comprising:

compensating for attenuation and offset in each of said output samples in said output vectors using said determined attenuation and offset.

42. A method as recited in claim 40 wherein said first and second known values are in different input vectors.

43. A method as recited in claim 40 wherein one of said known values is a maximum or a minimum value permitted by said video source.

* * * * *